(12) United States Patent (10) Patent No.: US 12,586,050 B2
Komiyama et al. (45) Date of Patent: Mar. 24, 2026

(54) SALES DATA PROCESSING METHOD AND SALES DATA PROCESSING TERMINAL

(71) Applicant: Toshiba Tec Kabushiki Kaisha, Tokyo (JP)

(72) Inventors: Hikaru Komiyama, Yokohama Kanagawa (JP); Kanako Nakahara, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 19 days.

(21) Appl. No.: 18/443,225

(22) Filed: Feb. 15, 2024

(65) Prior Publication Data
US 2024/0311791 A1 Sep. 19, 2024

(30) Foreign Application Priority Data
Mar. 14, 2023 (JP) ................................ 2023-040022

(51) Int. Cl.
*G06Q 20/20* (2012.01)
(52) U.S. Cl.
CPC .................................. *G06Q 20/208* (2013.01)
(58) Field of Classification Search
CPC .. G06Q 20/208; G06Q 20/206; G07G 1/0009; G07G 1/0081; G07G 1/0045; G07G 1/14; G07F 17/0042
See application file for complete search history.

(56) References Cited

U.S. PATENT DOCUMENTS 10,579,917 B1 * 3/2020 Koeppel ............. H02J 7/00032
2021/0365914 A1 * 11/2021 Oe ......................... G06Q 20/20

FOREIGN PATENT DOCUMENTS

JP 2018-092424 A 6/2018
JP 2021-184127 A 12/2021
JP 2022-178576 A 12/2022

OTHER PUBLICATIONS

Japanese Office Action dated Dec. 2, 2025, mailed in counterpart Japanese Application No. 2023-040022, 8 pages (with translation).

* cited by examiner

*Primary Examiner* — A. Hunter Wilder
(74) *Attorney, Agent, or Firm* — Kim & Stewart LLP

(57) ABSTRACT

A method for controlling a terminal capable of performing a point-of-sale (POS) function, includes receiving an input of a particular operation via an input device of the terminal or a particular symbol via an imaging device of the terminal, selecting either a first mode or a second mode corresponding to the particular operation or the particular symbol, and displaying one or more screens for registering a commodity for purchase according to the selected mode. One or more functions that are usable in the first mode are disabled in the second mode.

12 Claims, 19 Drawing Sheets

Figure 2:
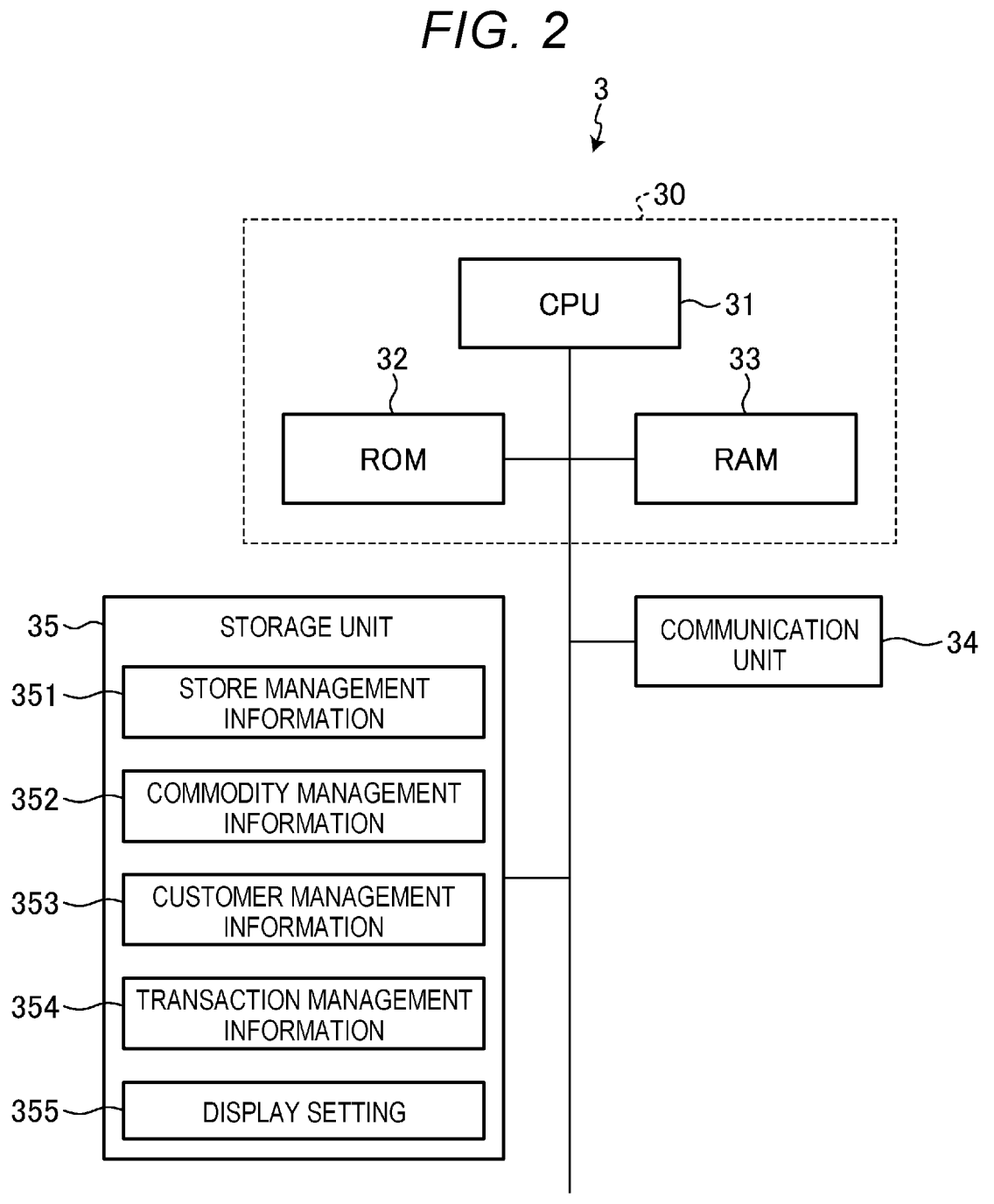

| CPU | ~31 |

32

33

| ROM | | RAM |

35 — STORAGE UNIT

COMMUNICATION UNIT ~34

351 — STORE MANAGEMENT INFORMATION

352 — COMMODITY MANAGEMENT INFORMATION

353 — CUSTOMER MANAGEMENT INFORMATION

354 — TRANSACTION MANAGEMENT INFORMATION

355 — DISPLAY SETTING

351

| COMPANY ID | COMPANY NAME | STORE ID | STORE NAME | OWNED TERMINAL | TERMINAL TYPE | ... |
|---|---|---|---|---|---|---|

352

| COMPANY ID | STORE ID | COMMODITY CODE | COMMODITY NAME | UNIT PRICE | ADDITIONAL INFORMATION | COMMODITY IMAGE | ... |
|---|---|---|---|---|---|---|---|

353

| USER ID | USER NAME | CONTACT ADDRESS | ... |
|---|---|---|---|

354

| COMPANY ID | STORE ID | TERMINAL CODE (RENTAL ONLY) | TRAN-SACTION ID | COMMODITY INFORMATION | | | | USER ID (MEMBER ONLY) | ... |
|---|---|---|---|---|---|---|---|---|---|
| | | | | COMMODITY CODE | UNIT PRICE | NUMBER | ... | | |

| CONTENT ID | PRESENTATION CONTENT | ... | NORMAL MODE | RENTAL MODE |
|---|---|---|---|---|
| ... | USAGE METHOD | ... | ON | ON |
| ... | TERM | ... | ON | OFF |
| ... | FAQ | ... | ON | ON |
| ... | ... | ... | ... | ... |
| ... | ... | ... | ON | ... |

Figure 8:
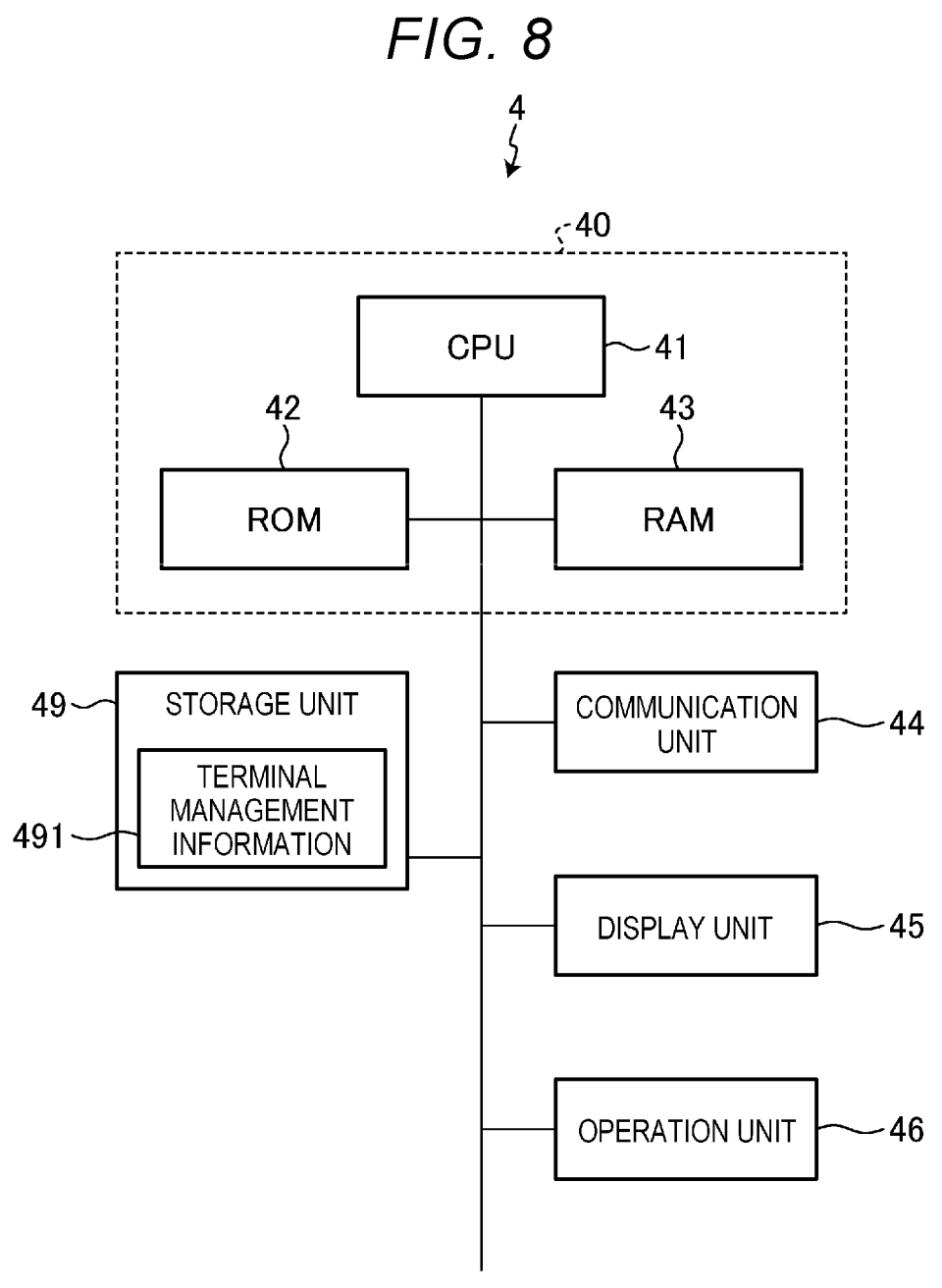

CPU ~41

42
ROM

43
RAM

49~ STORAGE UNIT

491~ TERMINAL MANAGEMENT INFORMATION

COMMUNICATION UNIT ~44

DISPLAY UNIT ~45

OPERATION UNIT ~46

| TERMINAL CODE | TERMINAL TYPE | ... |
|---|---|---|

Figures 15A, 15B, 15C, 15D:
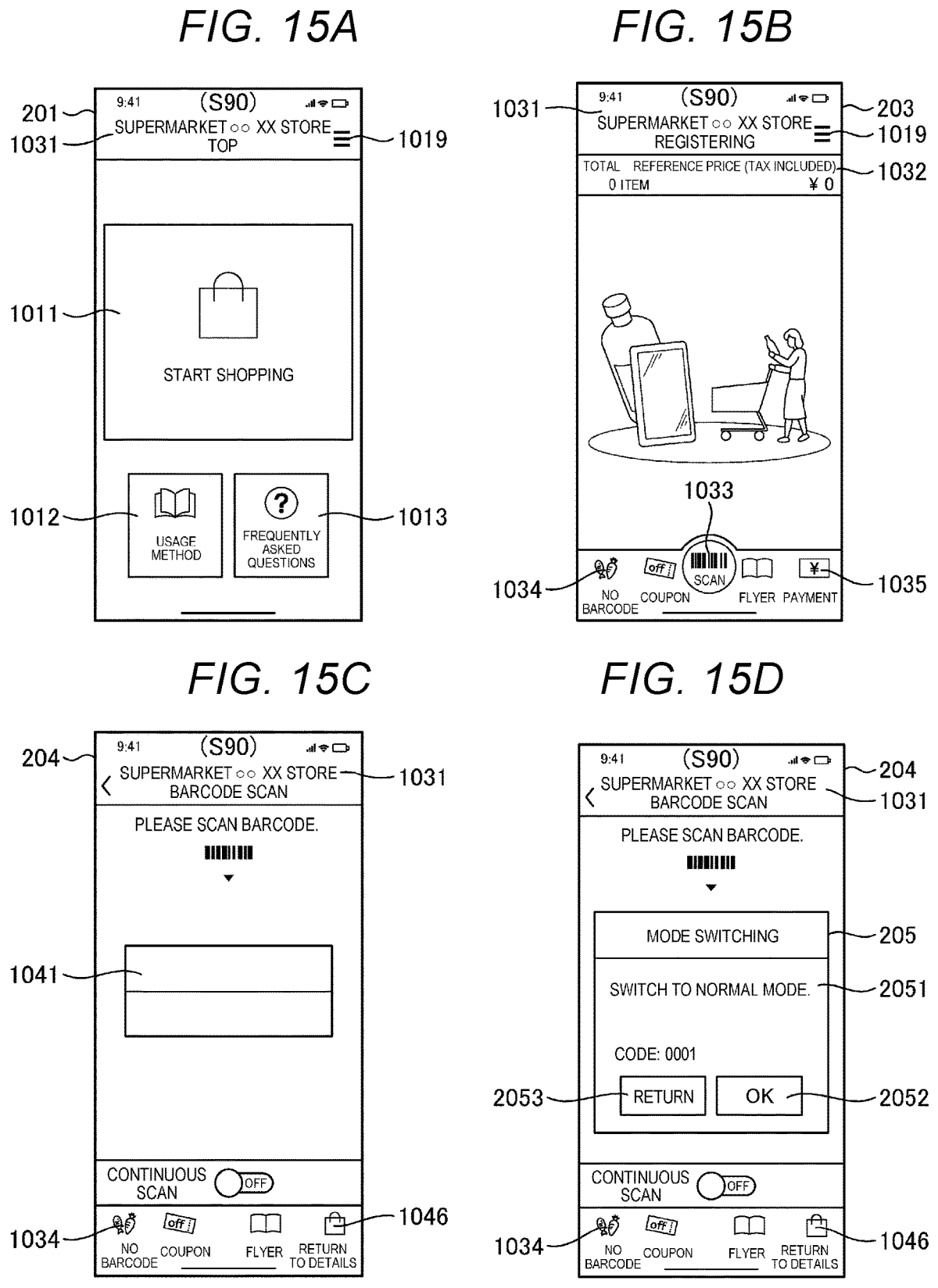

SUPERMARKET ○○ XX STORE
TOP — 1019

1011 —

START SHOPPING

1012 —

USAGE
METHOD

FREQUENTLY
ASKED
QUESTIONS — 1013

SUPERMARKET ○○ XX STORE
REGISTERING — 1019

TOTAL REFERENCE PRICE (TAX INCLUDED) — 1032
0 ITEM ¥ 0

1033

1034 — NO
BARCODE COUPON SCAN FLYER PAYMENT — 1035

SUPERMARKET ○○ XX STORE
BARCODE SCAN — 1031

PLEASE SCAN BARCODE.

▼

1041 —

CONTINUOUS
SCAN OFF

1034 — NO
BARCODE COUPON FLYER RETURN
TO DETAILS — 1046

SUPERMARKET ○○ XX STORE
BARCODE SCAN — 1031

PLEASE SCAN BARCODE.

▼

MODE SWITCHING — 205

SWITCH TO NORMAL MODE. — 2051

CODE: 0001

2053 — RETURN OK — 2052

CONTINUOUS
SCAN OFF

1034 — NO
BARCODE COUPON FLYER RETURN
TO DETAILS — 1046

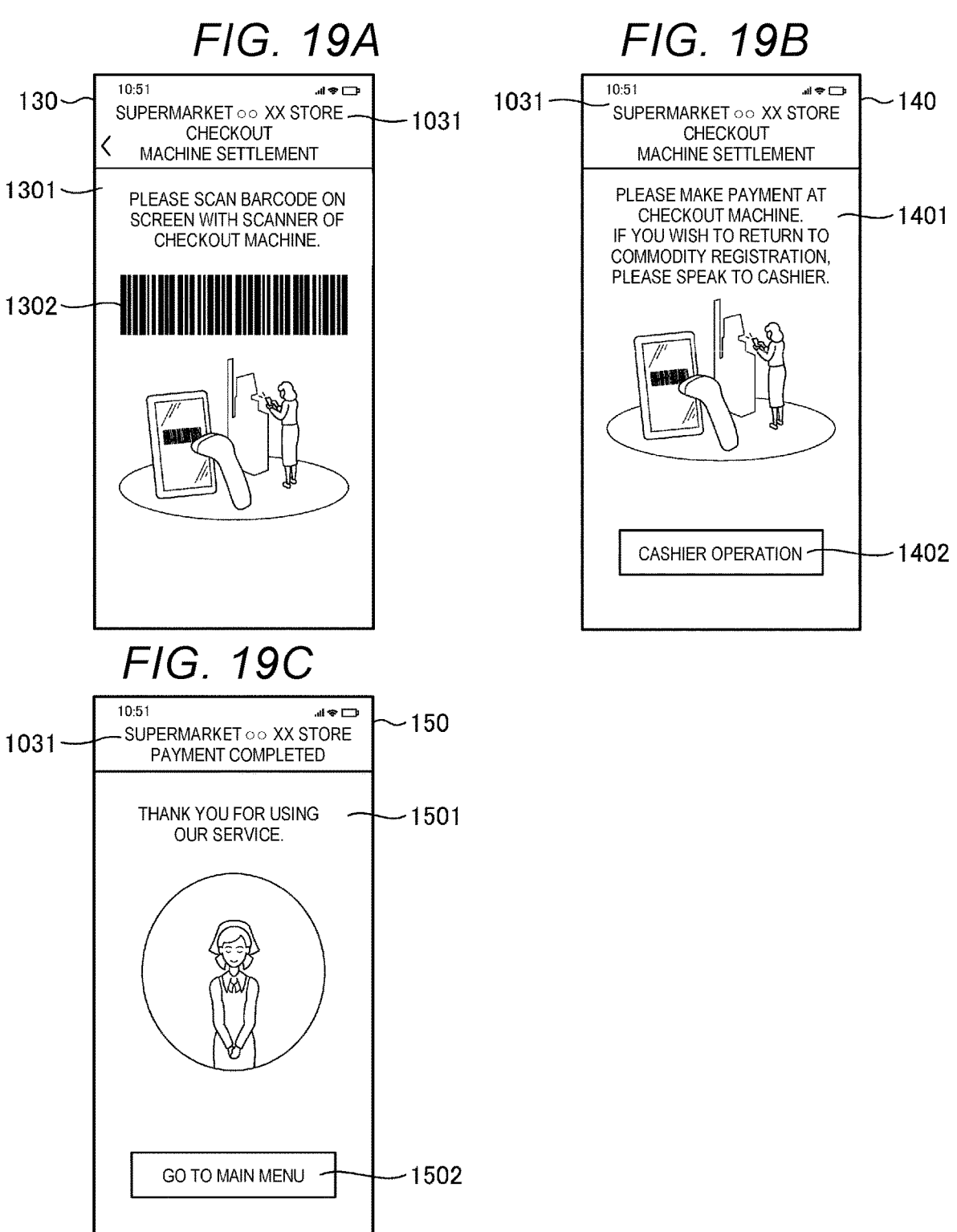

SUPERMARKET ○○ XX STORE — 1031
CHECKOUT
MACHINE SETTLEMENT

1301 — PLEASE SCAN BARCODE ON SCREEN WITH SCANNER OF CHECKOUT MACHINE.

SUPERMARKET ○○ XX STORE — 140
CHECKOUT
MACHINE SETTLEMENT

PLEASE MAKE PAYMENT AT CHECKOUT MACHINE. — 1401
IF YOU WISH TO RETURN TO COMMODITY REGISTRATION, PLEASE SPEAK TO CASHIER.

CASHIER OPERATION — 1402

SUPERMARKET ○○ XX STORE — 150
PAYMENT COMPLETED

THANK YOU FOR USING OUR SERVICE. — 1501

GO TO MAIN MENU — 1502

FIG. 20A 101
170
1011
1701
1702
1703
1704
1705
1012
1014

STORE:

USAGE METHOD

TERMS OF USE

FREQUENTLY ASKED QUESTIONS

OPEN SOURCE LICENSE

CUSTOMER INFORMATION

TERMINAL ID:
xxxxxxxxxxxxxxxxxxxxxxxxxx
VERSION: x.x.xx

FIG. 20B 201
270
1011
1701
1703
1704

STORE:

USAGE METHOD

FREQUENTLY ASKED QUESTIONS

OPEN SOURCE LICENSE

TERMINAL ID:
xxxxxxxxxxxxxxxxxxxxxxxxxx
VERSION: x.x.xx

FIG. 21A 103
171
1701
1702
1703
1704
1716
1705
1717
1034

TOTAL 0    STORE: XX STORE

USAGE METHOD

TERMS OF USE

FREQUENTLY ASKED QUESTIONS

OPEN SOURCE LICENSE

MEMBERSHIP CARD ID REGISTRATION

CUSTOMER INFORMATION

STOP SHOPPING

TERMINAL ID:
xxxxxxxxxxxxxxxxxxxxxxxxxx
VERSION: x.x.xx

NO BARCO

FIG. 21B 203
271
1701
1703
1704
1717
1034

TOTAL 0    STORE: XX STORE

USAGE METHOD

FREQUENTLY ASKED QUESTIONS

OPEN SOURCE LICENSE

STOP SHOPPING

TERMINAL ID:
xxxxxxxxxxxxxxxxxxxxxxxxxx
VERSION: x.x.xx

NO BARCO

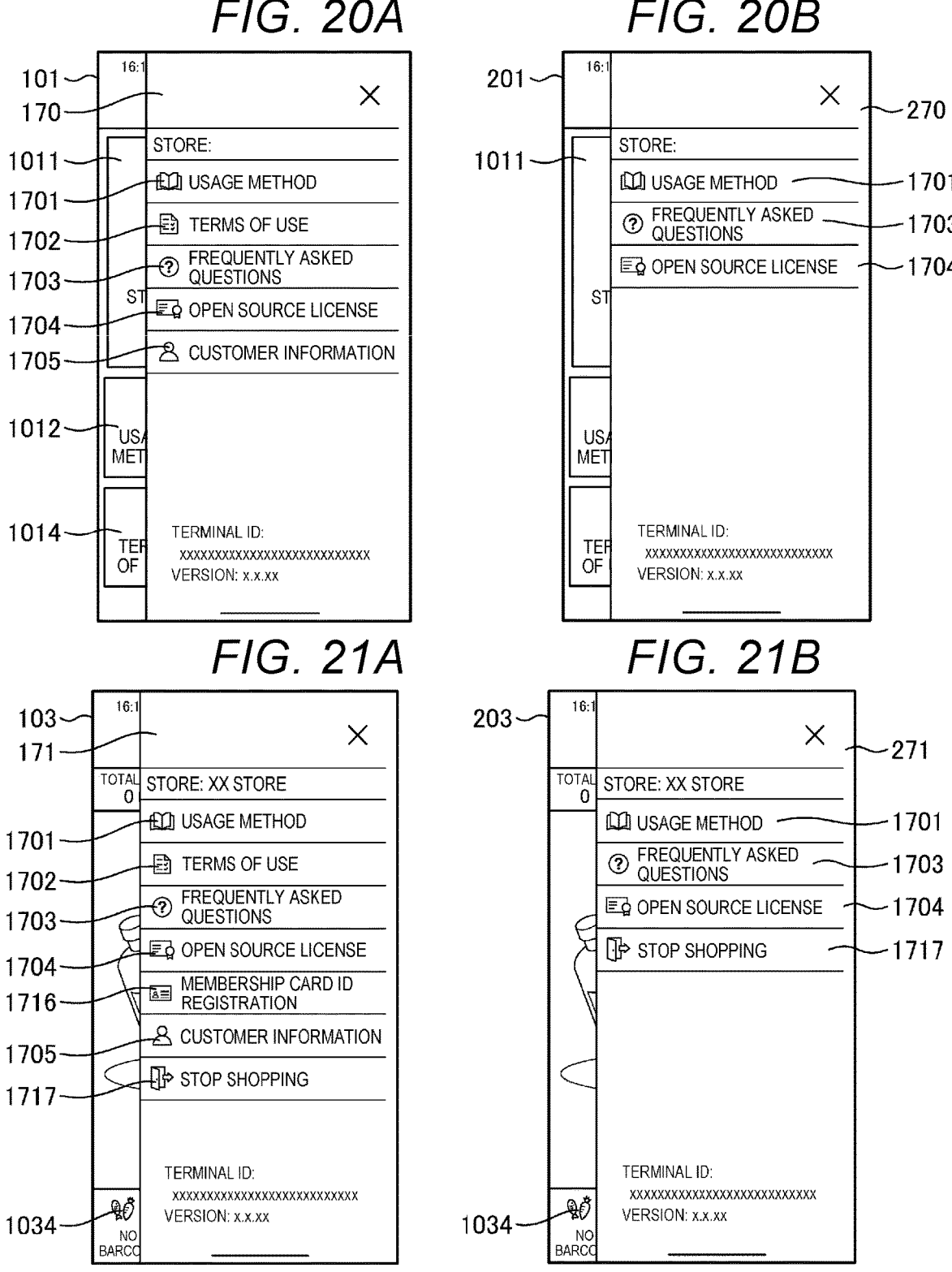

*FIG. 24A*          *FIG. 24B*
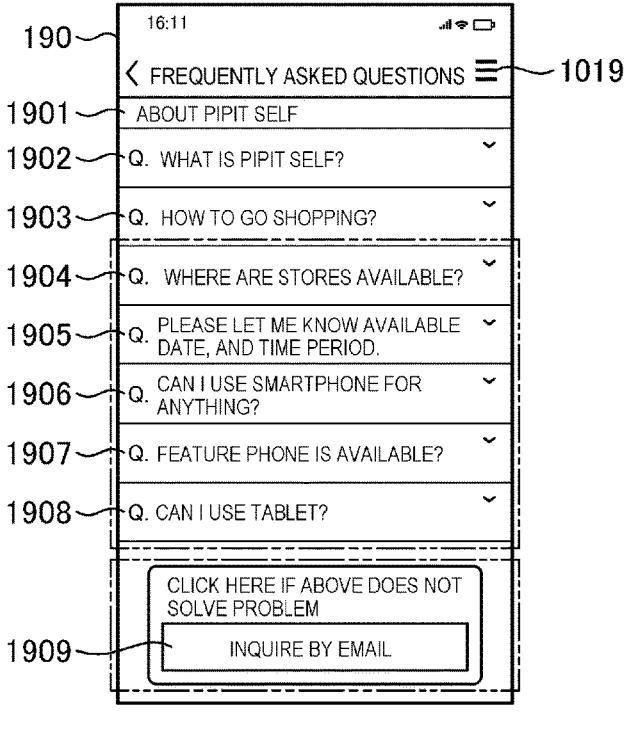
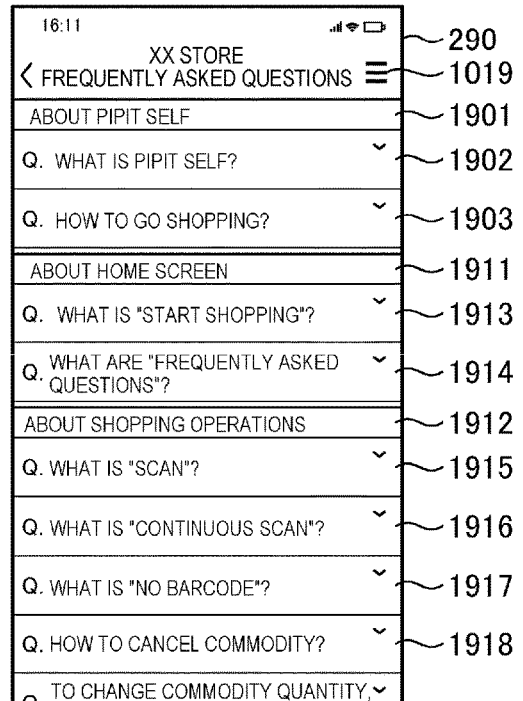

SALES DATA PROCESSING METHOD AND SALES DATA PROCESSING TERMINAL

CROSS-REFERENCE TO RELATED APPLICATION

This application is based upon and claims the benefit of priority from Japanese Patent Application No. 2023-040022, filed Mar. 14, 2023, the entire contents of which are incorporated herein by reference.

FIELD

Embodiments described herein relate generally to a sales data processing method and a sales data processing terminal.

BACKGROUND

In recent years, it has become common for customers at a store to perform commodity registration using a portable point-of-sale (POS) terminal device such as a smartphone or a tablet terminal. Such a terminal device can be a customer terminal owned by a customer or a loaned terminal ("rental terminal") provided at the store.

Application software for performing the POS function needs to be installed in the customer terminal and the loaned terminal. It is preferable that the same application software can operate on both the customer terminal and the loaned terminal to avoid confusion for the users and decrease software development and maintenance cost.

However, if the same application software is used by both the customer terminal and the loaned terminal, some functions that are necessary for one of the terminals may be unsuitable and unnecessary for the other terminal. Similarly, screens and explanation items may be necessary for one of the terminals but unnecessary for the other terminal. Further, text or messages suitable for one of the terminals may be inappropriate for the other terminal.

BRIEF DESCRIPTION OF THE DRAWINGS

FIG. 2 is a diagram showing an example of a hardware configuration of a server device.

FIG. 7 is a diagram showing an example of a data configuration of display setting.

FIG. 8 is a diagram showing an example of a hardware configuration of a store terminal.

FIG. 9 is a diagram showing an example of a data configuration of terminal management information.

FIG. 10 is a diagram showing an example of a hardware configuration of a loaned terminal and a customer terminal.

FIG. 11 is a block diagram showing an example of a hardware configuration of a checkout device.

FIG. 12 is a block diagram showing a functional configuration of the server device, the store terminal, the loaned terminal, and the customer terminal.

FIGS. 15A to 15D are diagrams showing examples of screens;

FIGS. 19A to 19C are diagrams showing examples of screens.

FIGS. 20A and 20B are diagrams showing examples of screens.

FIGS. 21A and 21B are diagrams showing examples of screens.

FIGS. 24A and 24B are diagrams showing examples of screens.

DETAILED DESCRIPTION

In general, according to one embodiment, a sales data processing method that enables application software for performing mobile POS functions to be compatible with different terminals is provided.

According to one embodiment, a method for controlling a terminal capable of performing a point-of-sale (POS) function, includes receiving an input of a particular operation via an input device of the terminal or a particular symbol via an imaging device of the terminal, selecting either a first mode or a second mode corresponding to the particular operation or the particular symbol, and displaying one or more screens for registering a commodity for purchase according to the selected mode. One or more of functions that are usable in the first mode are disabled in the second mode.

Figure 1:
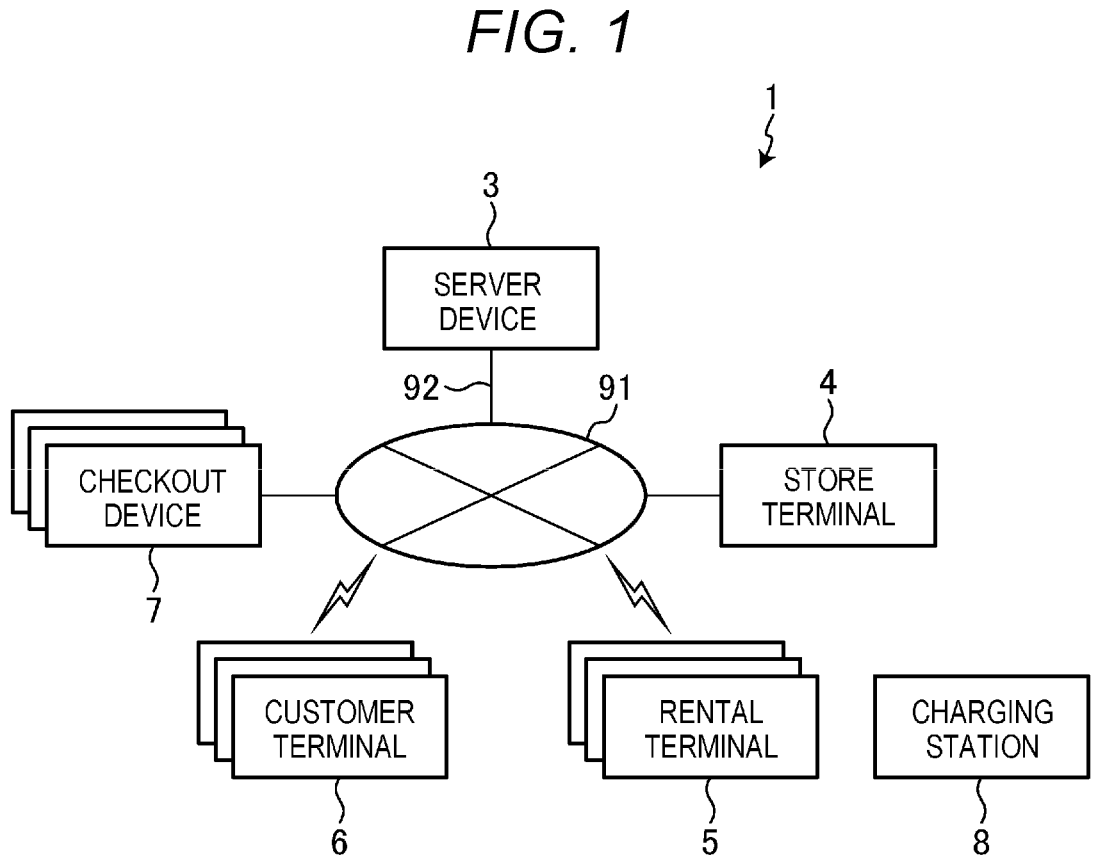
FIG. 1 is a diagram showing a configuration of a sales data processing system according to an embodiment.

Embodiments will be described with reference to the drawings. FIG. 1 is a diagram showing a configuration of a sales data processing system 1 according to an embodiment. The sales data processing system 1 includes a server device 3, a store terminal 4, mobile terminals including loaned terminals 5 and customer terminals 6, checkout devices 7, a charging station 8, and an in-store network 91.

The sales data processing system 1 may include a POS terminal. The POS terminal includes, for example, a conventional POS terminal operated by a store clerk or a self-service-type terminal by which a customer performs an operation related to commodity registration and settlement or checkout. Each mobile terminal, whether the loaned terminal 5 or customer terminal 6, functions as a mobile POS terminal.

The in-store network 91 is, for example, a local area network (LAN) in a store, by which the store terminal 4, the checkout device 7, the loaned terminal 5, and the customer terminal 6 are connected to each other.

The server device 3 is a cloud server, and is communicably connected to another device (e.g., the store terminal 4, the checkout device 7, the loaned terminal 5, and the customer terminal 6) via a public network 92 such as a mobile communication network or the Internet and the in-store network 91. In communication via the public network 92, encryption and virtual private network (VPN) connection are used as necessary.

The loaned terminal 5 and the customer terminal 6 are, for example, portable terminal devices or mobile terminals such as smartphones and tablet terminals. The loaned terminal 5 is a terminal device that the store rents to the customer, and the customer terminal 6 is a terminal device owned by the customer.

In the sales data processing system 1, the same application software is operated in the loaned terminal 5 and the customer terminal 6 to cause each terminal to function as a mobile POS terminal. Accordingly, the application software can be operated in a rental mode ("loaned terminal mode") in the loaned terminal 5 and in a normal mode ("customer terminal mode") in the customer terminal 6.

The normal mode is also referred to as a first mode, and is an operation mode in which all functions provided by the application software can be used. The rental mode is also referred to as a second mode and is an operation mode in which part of functions available in the first mode is set to be in an unusable state or disabled. For example, in the rental mode, a store selection function is in an unused state. In this context, the store selection function is for selecting a store and then associating the store with the terminal device, and is generally executed in the normal mode before starting a transaction.

The charging station 8 is, for example, a shelf-shaped fixture used as a place for storing the loaned terminals 5. The charging station 8 supplies power to each loaned terminal 5. A loaned terminal 5 that receives the power from the charging station 8 charges a battery therein. Such a charging station 8 can be disposed at a predetermined position in the store (for example, near an entrance of the store).

The loaned terminal 5 and the customer terminal 6 acquire information such as commodity information from the server device 3 via the public network 92 such as a mobile communication network or the Internet. The loaned terminal 5 and the customer terminal 6 may be wirelessly connectable to the in-store network 91 via access points disposed at a plurality of locations in the store, and may accordingly acquire information via the in-store network 91 instead of acquiring information via the public network 92.

The loaned terminal 5 and the customer terminal 6 provide a graphical user interface (GUI) in cooperation with the server device 3, and perform a sales data process such as commodity registration based on received information on a commodity (that is, provide POS functions).

The checkout device 7 receives an operation related to payment for a commodity registered by the loaned terminal 5 or the customer terminal 6, and performs a checkout process or settlement process.

FIG. 2 is a diagram showing an example of a hardware configuration of the server device 3. The server device 3 is an example of an information processing device. The server device 3 includes a central processing unit (CPU) 31, a read only memory (ROM) 32, a random access memory (RAM) 33, a communication unit 34, and a storage unit 35.

The CPU 31 is an example of a processor and performs overall control over each unit in the server device 3. The ROM 32 stores various programs. The RAM 33 is a workspace for loading programs and various types of data.

The CPU 31, the ROM 32, and the RAM 33 are connected via a bus or the like to constitute a controller 30. In the controller 30, the CPU 31 executes a program stored in the storage unit 35 and loaded into the RAM 33, thereby executing various processes.

The communication unit 34 is a wired or wireless communication interface circuit connectable to the public network 92. The communication unit 34 communicates with the store terminal 4, the checkout device 7, the loaned terminal 5, and the customer terminal 6 via the public network 92 and the in-store network 91.

The storage unit 35 includes a storage medium such as a hard disk drive (HDD) or a flash memory, and maintains storage contents even when the power is cut off. The storage unit 35 stores programs that can be executed by the CPU 31 and various types of setting information.

The storage unit 35 stores store management information 351, commodity management information 352, customer management information 353, transaction management information 354, display settings 355, and the like.

Figures 3, 4, 5, 6:
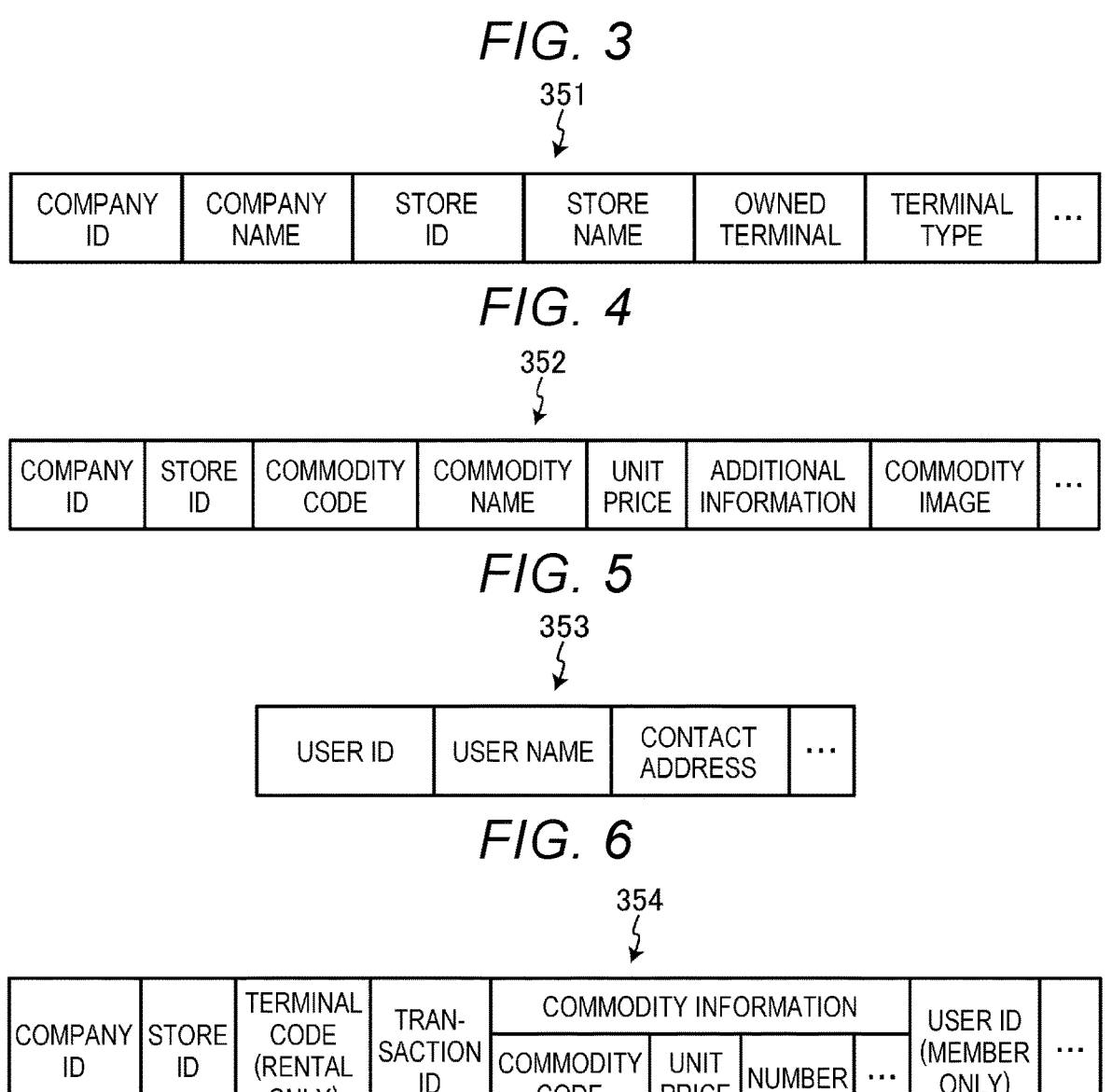
FIG. 3 is a diagram showing an example of a data configuration of store management information.
FIG. 4 is a diagram showing an example of a data configuration of commodity management information.
FIG. 5 is a diagram showing an example of a data configuration of customer management information.
FIG. 6 is a diagram showing an example of a data configuration of transaction management information.

FIG. 3 is a diagram showing an example of a data configuration of the store management information 351. The store management information 351 is information for managing a store, and is stored in the form of a data table, for example. The store management information 351 includes a company ID, a company name, a store ID, a store name, an owned terminal, a terminal type, and the like of each store managed by the server device 3.

In the company name field, information indicating a name of a company corresponding to the company ID is stored. In the store name field, information indicating a name of a store corresponding to the store ID is stored.

A terminal code is stored in the owned terminal field. The terminal code is an example of an identifier for a loaned terminal 5. In the terminal type field, for example, a type (or form) of a terminal device such as "smartphone" or "tablet" is stored.

A plurality of store IDs can be stored for each company ID. A plurality of owned terminals can be stored for one store ID. The owned terminal and the terminal type are stored in a 1:1 relationship. Information about the owned terminal and information about the terminal type can be provided by processes executed in cooperation with the server device 3 in response to an operation to the store terminal 4 each time the number of loaned terminals 5 owned by the store is increased.

FIG. 4 is a diagram showing an example of a data configuration of the commodity management information 352. The commodity management information 352 is information for managing a commodity and is stored in the form of a data table, for example. The commodity management information 352 includes a company ID, a store ID, a commodity code, a commodity name, a unit price, additional information, a commodity image, and the like. The commodity management information 352 functions as a commodity master database for extracting, from the POS terminal, commodity information using a commodity code as a key.

The commodity code is an example of an identifier that enables identification of a type of commodity. The company ID and the store ID are information for specifying a store, and indicate a store selling a commodity indicated by the commodity code stored in the same record.

In the commodity name field, a name of a commodity indicated by the commodity code is stored. In the unit price item, a price per one commodity indicated by the commodity code is stored.

The additional information is information on the commodity indicated by the commodity code. In the additional information field, for example, a type, size, color, material, and manufacturer of the commodity are stored.

In the commodity image field, image data representing a commodity corresponding to the commodity code (for example, image data of an appearance of the commodity) is stored.

The commodity management information 352 is updated at any timing.

FIG. 5 is a diagram showing an example of the data configuration of the customer management information 353. The customer management information 353 is information for managing a customer and is stored in the form of a data table, for example. The customer management information 353 includes a user ID and user information such as a user name and a contact address correlated with the user ID. Here, the user ID is an example of an identifier that enables identification of each customer registered as a member.

In the user name field, information indicating a name of the customer corresponding to the user ID is stored. In the contact address field, a contact address of the customer corresponding to the user ID (for example, a telephone number, a mail address, account information on SNS, and an address) is stored.

FIG. 6 is a diagram showing an example of a data configuration of the transaction management information 354. The transaction management information 354 is information for managing a transaction performed by the loaned terminal 5 or the customer terminal 6, and is stored in the form of a data table, for example. The transaction management information 354 includes a company ID, a store ID, a terminal code, a transaction ID, commodity information, a user ID, and the like.

In the terminal code field, a terminal code of the loaned terminal 5 is stored if the terminal device performing the transaction is a loaned terminal 5. In the user ID field, if it is confirmed that the user who performs the transaction is a member, a user ID of the member is stored.

In the transaction management information 354, a transaction is specified based on a combination of the company ID, the store ID, and the transaction ID.

The transaction ID is information for specifying a transaction, is dispensed in the server device 3 every time a new transaction is started in the loaned terminal 5 or the customer terminal 6, and is used until an end of the transaction (i.e., completion of the checkout process). The dispensed transaction ID is notified (transmitted) to the loaned terminal 5 or the customer terminal 6 and is stored in a predetermined storage area of a storage unit 59 that is referred to during commodity registration.

The commodity information in the transaction management information 354 includes a commodity code, a commodity name, a unit price, the number, and the like. One or more pieces of commodity information can be registered for one transaction ID. In the number field, the number of commodities indicated by the commodity code that the customer intends to purchase is stored.

FIG. 7 is a diagram showing an example of a data configuration of the display setting 355. The display setting 355 is information for managing items to be displayed on a screen, and is stored in the form of a data table, for example. The display setting 355 includes a content ID, a presentation content, an ON or OFF setting in the normal mode, an ON or OFF setting in the rental mode, and the like.

The content ID is information for specifying the presentation content. The presentation content includes various screens, operation elements such as GUI components in the screen, text data and image data to be displayed on the screen, and the like, and is stored in correlation with the content ID.

The ON or OFF setting in the normal mode is setting as to whether to display the presentation content during an operation in the normal mode, that is, whether to display the presentation content on the customer terminal 6, and the presentation content correlated with the content ID with the normal mode being ON is to be displayed in the normal mode on the customer terminal 6.

The ON or OFF setting in the rental mode is setting as to whether to display the presentation content during an operation in the rental mode, that is, whether to display the presentation content on the loaned terminal 5, and the presentation content correlated with the content ID with the rental mode being ON is to be displayed in the rental mode on the loaned terminal 5.

If there is a presentation content to be displayed in both the normal mode and the rental mode but wording in the normal mode is changed in the rental mode, for example, it is possible to set the display setting 355 as follows. First, records having the same content ID and different presentation contents are provided. Then, among these records, one record is ON in the normal mode and is OFF in the rental mode, and the other record is OFF in the normal mode and is ON in the rental mode. Accordingly, the presentation contents with the same content ID can be changed between the normal mode and the rental mode.

The store terminal 4 is a terminal device placed, for example, in a back office of a store. The store terminal 4 is used to receive, for example, communication or the like from the server device 3 managed by a main office or the like that manages a plurality of affiliated stores, or transmit information related to sales at the store to the server device 3.

FIG. 8 is a diagram showing an example of a hardware configuration of the store terminal 4. The store terminal 4 includes a CPU 41, a ROM 42, a RAM 43, a communication unit 44, a display unit 45, an operation unit 46, a storage unit 49, and the like.

The CPU 41 is an example of a processor and performs overall control over each unit in the store terminal 4. The ROM 42 stores various programs. The RAM 43 is a workspace for loading programs and various types of data.

The CPU 41, the ROM 42, and the RAM 43 are connected via a bus or the like to constitute a controller 40. In the controller 40, the CPU 41 executes a program stored in the ROM 42 or the storage unit 49 and loaded into the RAM 43, thereby executing various processes.

The communication unit 44 is a communication interface circuit connectable to the in-store network 91. The communication unit 44 communicates with external devices such as the loaned terminal 5, the customer terminal 6, the checkout device 7, and the server device 3 via the in-store network 91.

The display unit 45 includes a display device such as a liquid crystal display (LCD). The display unit 45 displays various types of information under control of the CPU 41. The operation unit 46 includes input devices such as a keyboard and a pointing device. The operation unit 46 receives an operation input via an input device. The operation unit 46 may be a touch panel on the display unit 45.

The storage unit 49 includes a storage medium such as an HDD or a flash memory, and maintains storage contents even when the power is cut off. The storage unit 49 stores programs that can be executed by the CPU 41 and various types of setting information.

The storage unit 49 stores terminal management information 491 and the like. The terminal management information 491 is information for managing the loaned terminal 5 to be rented to the customer at the store, and is stored in the form of a data table, for example.

Figure 9:
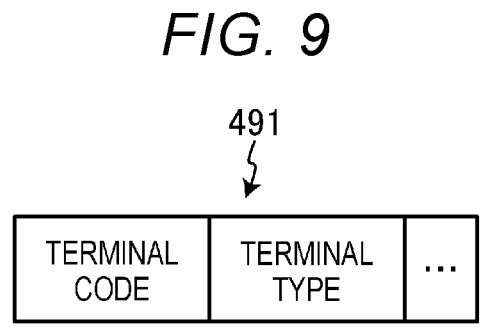

FIG. 9 is a diagram showing an example of a data configuration of the terminal management information 491. The terminal management information 491 is information for managing information about the loaned terminal 5 owned by the store, and is stored in the form of a data table, for example. Records in the data table are added by processes executed in cooperation with the server device 3 in response to an operation of the store terminal 4 each time the number of loaned terminals 5 owned by the store is increased.

The terminal management information 491 includes a terminal code, a terminal type, and the like. The terminal code is an example of an identifier for the loaned terminal 5 and is information that allows the loaned terminal 5 to be specified. The terminal code is the same as that stored in the owned terminal field in the store management information 351. Similar to the store management information 351, a type or form of a terminal device such as "smartphone" or "tablet" is stored in the terminal type field.

When providing a new loaned terminal 5, a store clerk performs a predetermined operation to register that loaned terminal 5 on the store terminal 4, and receives a terminal code from the server device 3. The terminal code is stored in the terminal code field of the terminal management information 491. In addition, the terminal code is stored in the owned terminal field of the store management information 351.

Figure 10:
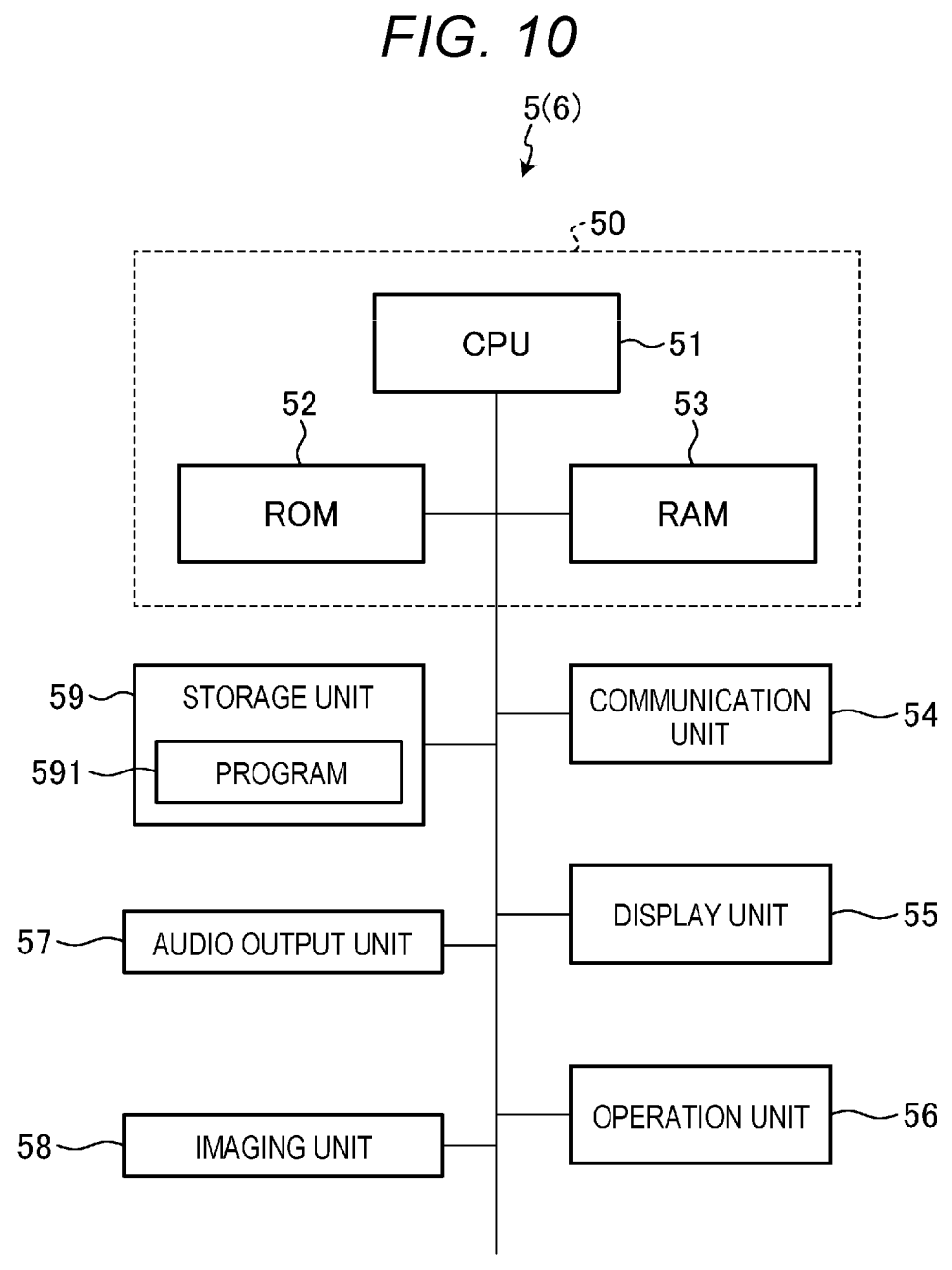

FIG. 10 is a diagram showing an example of a hardware configuration of the loaned terminal 5 and the customer terminal 6. The loaned terminal 5 and the customer terminal 6 each include a CPU 51, a ROM 52, a RAM 53, a communication unit 54, a display unit 55, an operation unit 56, an audio output unit 57, an imaging unit 58, the storage unit 59, and the like.

The CPU 51 is an example of a processor, and performs overall control over each unit in the loaned terminal 5 and the customer terminal 6. The ROM 52 stores various programs. The RAM 53 is a workspace for loading programs and various types of data.

The CPU 51, the ROM 52, and the RAM 53 are connected via a bus or the like to constitute a controller 50. In the controller 50, the CPU 51 executes a program stored in the ROM 52 or the storage unit 59 and loaded into the RAM 53, thereby executing various processes.

The communication unit 54 is a wireless communication interface circuit connectable to the public network 92 such as a mobile communication network or the Internet and the in-store network 91. The communication unit 54 communicates with external devices such as the server device 3, the store terminal 4, and the checkout device 7 via the public network 92 or the in-store network 91. The communication unit 54 has a near field communication function such as Bluetooth®.

The display unit 55 is a display device such as an LCD. The display unit 55 displays various types of information under control of the CPU 51. The operation unit 56 is an input device such as a touch panel superimposed a surface of the LCD. The operation unit 56 outputs an operation content input via an input device to the CPU 51.

The audio output unit 57 is a speaker that outputs sounds under control of the CPU 51.

The imaging unit 58 includes an imaging device such as a charge coupled device (CCD) or a complementary MOS (CMOS). The imaging unit 58 is used for imaging, for example, a code symbol such as a barcode and a two-dimensional code attached to a commodity. In other words, the imaging unit 58 acquires a code symbol such as a barcode and a two-dimensional code attached to the commodity.

The storage unit 59 includes a storage medium such as an HDD or a flash memory, and maintains storage contents even when the power is cut off. The storage unit 59 stores a program 591 that can be executed by the CPU 51 and various types of setting information. The storage unit 59 stores, for example, a transaction ID notified from the server device 3 in a storage area that is referred to during commodity registration.

The program 591 is, for example, a mobile POS application. The mobile POS application is an application program that causes a mobile terminal such as a smartphone or a tablet terminal in which the mobile POS application is installed to function as a mobile POS terminal. Information stored in the storage unit 59 is not limited to the illustrated example.

Figure 11:
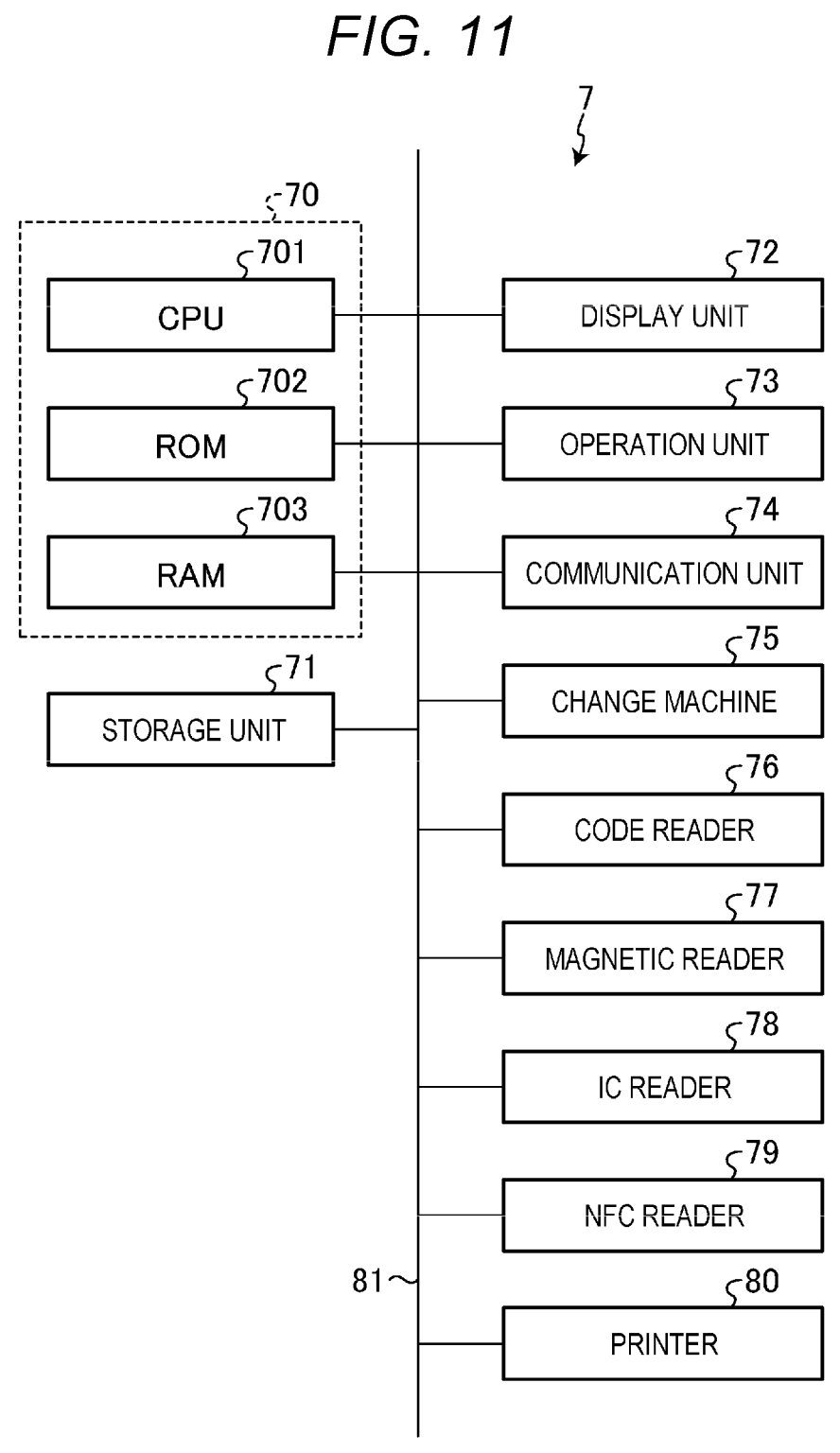

FIG. 11 is a block diagram showing an example of a hardware configuration of the checkout device 7. The checkout device 7 includes a controller 70, a storage unit 71, a display unit 72, an operation unit 73, a communication unit 74, a change machine 75, a code reader 76, a magnetic reader 77, an IC reader 78, a near field communication (NFC) reader 79, and a printer 80. The checkout device 7 may further include a buzzer, a speaker, an indicator lamp, and the like. The controller 70, the storage unit 71, the display unit 72, the operation unit 73, the communication unit 74, the change machine 75, the code reader 76, the magnetic reader 77, the IC reader 78, the NFC reader 79, the printer 80, and the like are communicably connected to each other via a bus 81 or the like.

The display unit 72 is a display device such as an LCD, and displays various types of information directed to an operator of the checkout device 7. The operation unit 73 is for inputting information to the controller 70, and is implemented by a keyboard, a touch panel, and the like.

The communication unit 74 is an interface circuit for the controller 70 to communicate with an external device (e.g., the store terminal 4, the server device 3, or the like). Based on the communication, the controller 70 transmits and receives information to and from the external device.

The change machine 75 is a device for a customer to pay with bills and/or coins and receive the change. If a payment amount is larger than a transaction amount, the change machine 75 dispenses one or more bills and/or coins.

The code reader 76 reads a code symbol such as a barcode or a two-dimensional code and outputs the decoded information. The code reader 76 is used, for example, to capture an image of a code symbol such as a barcode or a two-dimensional code displayed by the display unit 55 of the loaned terminal 5 or the customer terminal 6, which is presented by the customer. In other words, the code reader 76 scans a code symbol to acquire information represented thereby.

The magnetic reader 77 is provided along a slit for passing a credit card, and reads information recorded on a magnetic stripe attached to the credit card. The IC reader 78 reads information stored in an IC chip attached to a credit card or the like.

The NFC reader 79 is a communication unit compatible with NFC) technology, and reads credit card information and electronic money information stored in a non-contact IC wirelessly. The non-contact IC is attached to a card such as a credit card or a mobile terminal such as a smartphone. The magnetic reader 77, the IC reader 78, and the NFC reader 79 may be devices externally attached to the checkout device 7. The magnetic reader 77, the IC reader 78, and the NFC reader 79 may be separate devices or may be the same device as a settlement terminal.

After a checkout process, the printer 80 prints and outputs transaction information on a receipt paper.

The controller 70 includes a CPU 701, a ROM 702, and a RAM 703.

The CPU 701 controls an overall operation of the checkout device 7. The ROM 702 stores various programs and various types of information. The RAM 703 is used as a work area for the CPU 701. The control unit 70 functions as various processing units by the CPU 701 loading programs and information stored in the ROM 702 and the storage unit 71 into the RAM 703 and executing the programs and information, and executes various types of control of the checkout device 7.

The storage unit 71 is implemented by a storage medium such as an HDD or a flash memory, and maintains storage contents even when the power is cut off.

Figure 12:
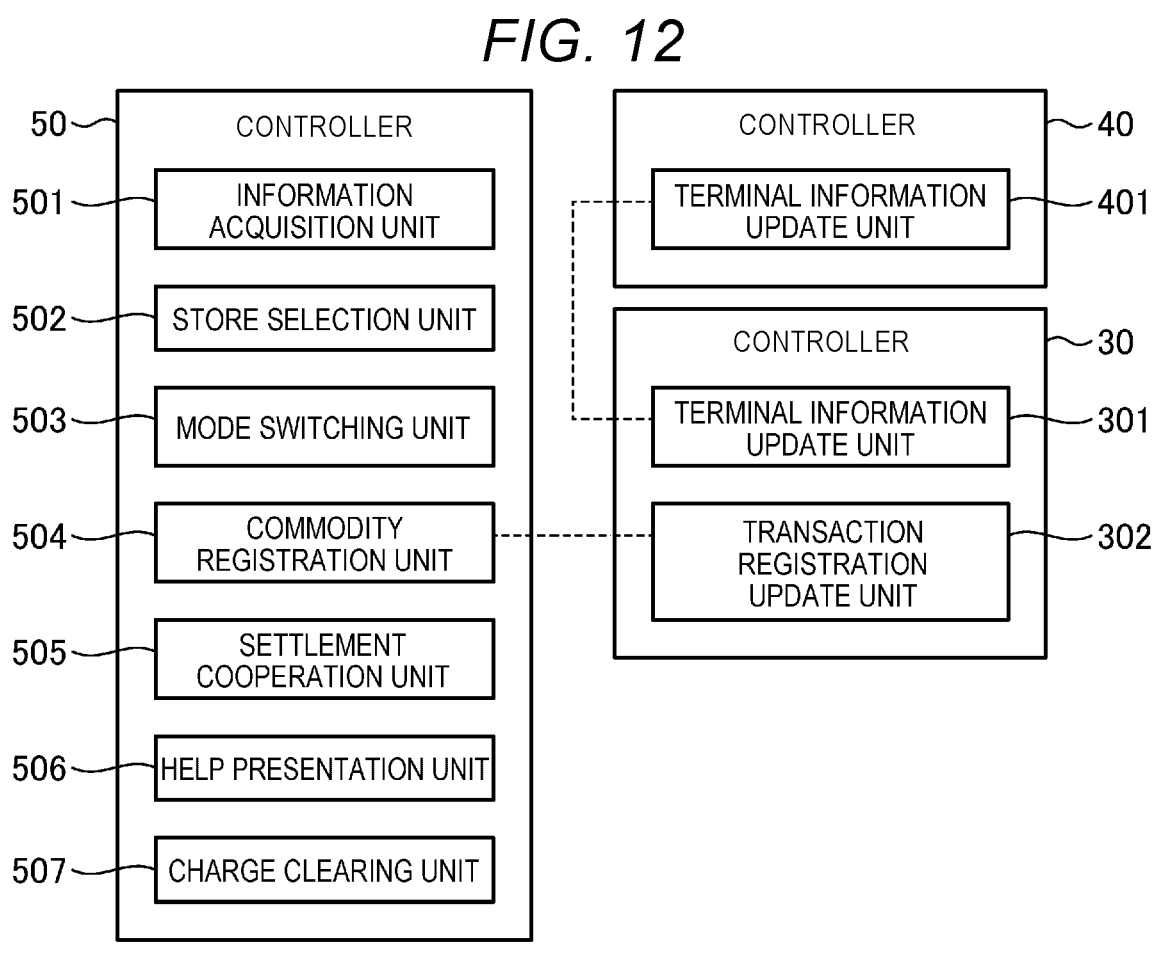

FIG. 12 is a block diagram showing a functional configuration of the server device 3, the store terminal 4, the loaned terminal 5, and the customer terminal 6. Some or all of the functions may be implemented by hardware such as a dedicated circuit.

The controller 50 of the loaned terminal 5 and the customer terminal 6 operates according to the program 591 stored in the storage unit 59 by the CPU 51 to function as an information acquisition unit 501, a store selection unit 502, a mode switching unit 503, a commodity registration unit 504, a settlement cooperation unit 505, a help presentation unit 506, a charge clearing unit 507, and the like.

The controller 30 of the server device 3 functions as a terminal information update unit 301, a transaction registration update unit 302, and the like by the CPU 31 operating according to a program stored in the ROM 32 or the storage unit 35. The transaction registration update unit 302 registers transaction information in the transaction management information 354 or updates the transaction information based on information related to a transaction received from the loaned terminal 5 or the customer terminal 6.

The controller 40 of the store terminal 4 functions as a terminal information update unit 401 and the like by the CPU 41 operating according to a program stored in the ROM 42 or the storage unit 49. The terminal information update unit 401 updates the terminal management information 491 in accordance with an operation received by the operation unit 46. In cooperation with the terminal information update unit 401, the terminal information update unit 301 of the server device 3 registers or updates a record of an owned terminal of a corresponding store in the store management information 351 as the terminal management information 491 is updated.

The information acquisition unit 501 controls the imaging unit 58 to acquire read information. For example, if a code symbol such as a barcode or a two-dimensional code is imaged by the imaging unit 58, the information acquisition unit 501 decodes the code symbol to acquire information stored in the code symbol.

For example, the information acquisition unit 501 acquires a commodity code from a code symbol such as a barcode attached to a commodity. In addition, for example, the information acquisition unit 501 acquires a store ID and a company ID from a code symbol such as a two-dimensional code posted at a store or the like.

The store selection unit 502 is a functional unit that implements the store selection function described above, and registers or stores information for specifying a store in which shopping is performed in the storage unit 59 that is referred to by the CPU 51 operating according to the program 591.

The mode switching unit 503 switches the operation mode of the application software operating on the loaned terminal 5 to either the first mode or the second mode based on an output of the operation unit 56 or the imaging unit 58. The second mode is an operation mode in which one or more of the functions of the first mode are in an unused state or disabled.

During the switching, if a transaction is in progress in the operation mode before switching, the mode switching unit 503 cancels the transaction.

The first mode is the normal mode, and the second mode is the rental mode. The normal mode is an operation mode for the customer terminal 6. The rental mode is an operation mode for the loaned terminal 5. After the application software is first installed in the loaned terminal 5, the operation mode when the application software is started for the first time is the normal mode. By performing an operation to switch the startup operation mode to the rental mode, the loaned terminal 5 will operate in the rental mode.

The normal mode is an operation mode in which all functions provided by the application software can be used. The rental mode is an operation mode in which one or more of the functions of the first mode are in an unusable state or disabled. Specifically, for example, in the rental mode, the store selection function is in an unused state. The store selection function is a function for selecting a store and associating the store with a terminal device, and is generally executed in the normal mode before starting a transaction.

Figures 13A, 13B, 13C, 13D:
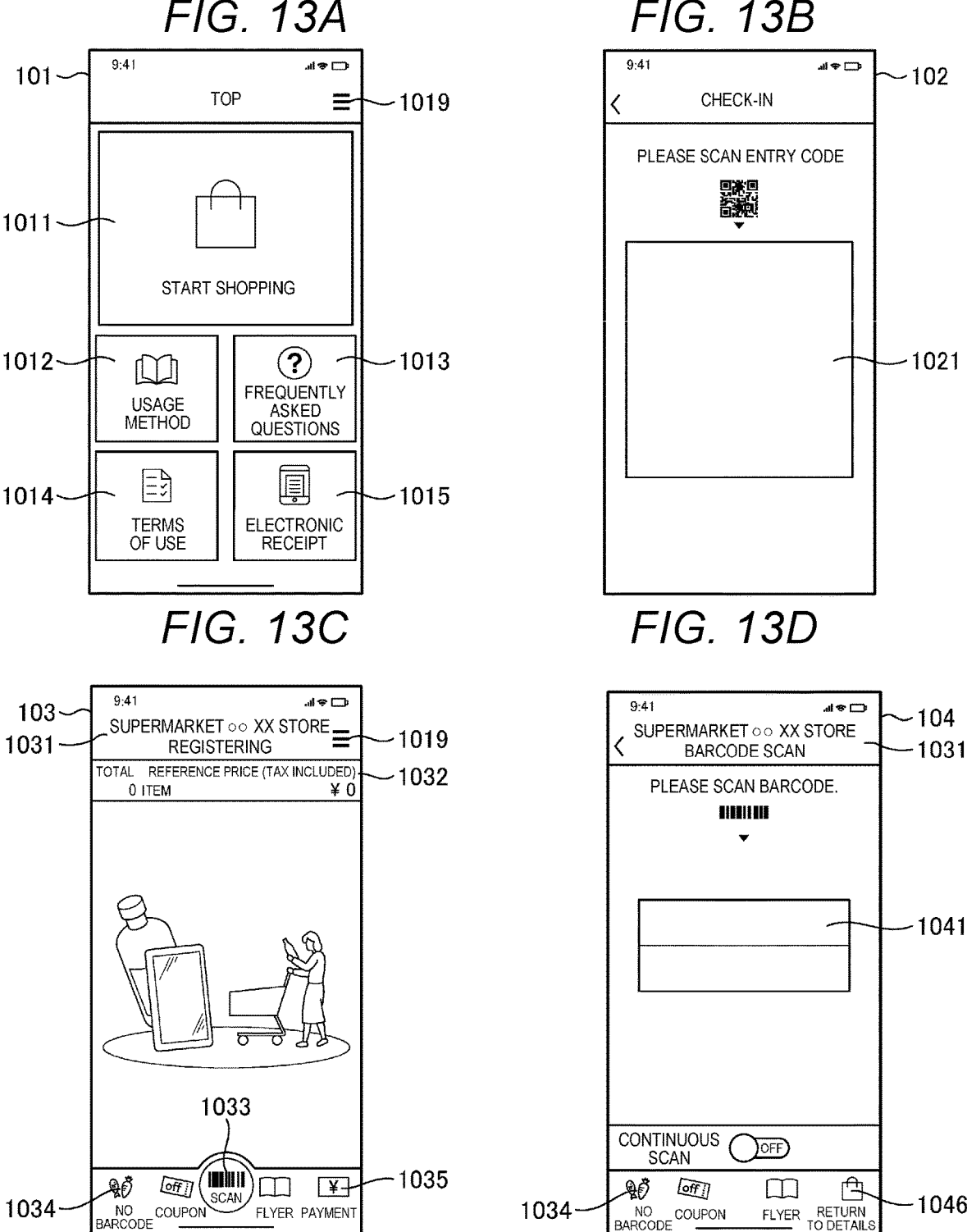
FIGS. 13A to 13D are diagrams showing examples of screens displayed by the loaned terminal or the customer terminal.
Figures 14A, 14B, 14C:
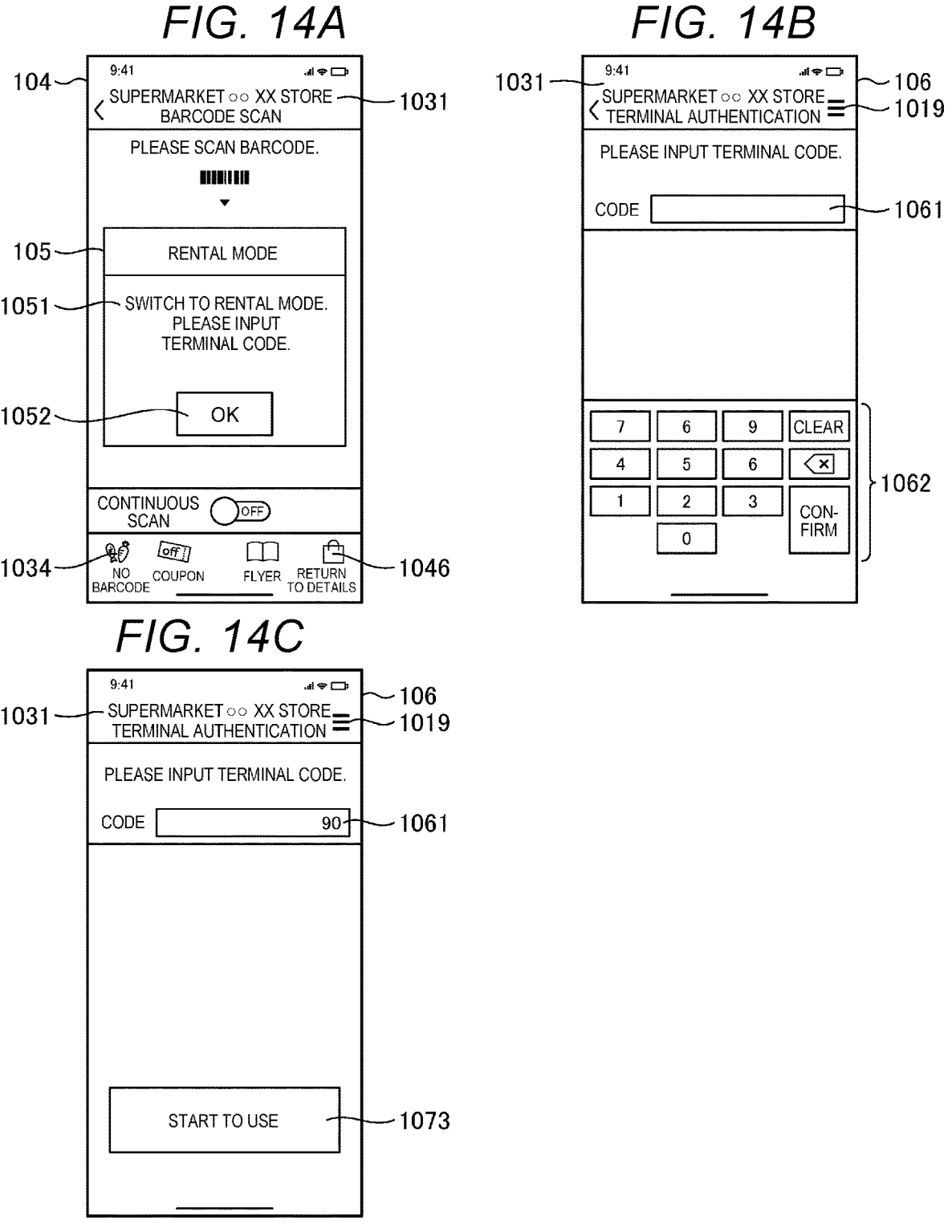
FIGS. 14A to 14C are diagrams showing examples of screens.

FIGS. 13A to 13D and FIGS. 14A to 14C are diagrams showing examples of screens displayed by the display unit 55 of the loaned terminal 5 or the customer terminal 6. FIG. 13A shows a top screen 101 in the normal mode. FIG. 13B shows a check-in screen 102. FIG. 13C shows a transaction start screen 103 in the normal mode. FIG. 13D shows an example of a reading screen 104 in the normal mode. FIG. 14A shows an example of the reading screen 104 on which a pop-up window 105 is displayed in a superimposed manner. FIGS. 14B and 14C show examples of a terminal authentication screen 106.

The top screen 101 in the normal mode includes operation elements 1011 to 1015 and 1019. The operation element 1011 receives an operation of instructing start of a transaction. The operation element 1012 receives an operation of displaying a usage method. The operation element 1013 receives an operation of displaying frequently asked questions (FAQ). The operation element 1014 receives an operation of displaying terms of use. The operation element 1015 receives an operation of displaying an electronic receipt. The operation element 1019 displays menus 170, 270 (see FIGS. 20A and 20B described later), 171, and 271 (see FIGS. 21A and 21B described later).

If the operation element 1011 on the top screen 101 receives an operation, a screen displayed by the display unit 55 transitions to the check-in screen 102 (see FIG. 13B). The check-in screen 102 is a screen displayed by the display unit 55 when the store selection function is executed by the store selection unit 502.

The check-in screen 102 includes a reading window 1021. An image captured by the imaging unit 58 is displayed on the reading window 1021. The information acquisition unit 501 decodes a code symbol displayed on the reading window 1021.

If the imaging unit 58 of the loaned terminal 5 or the customer terminal 6 faces a code symbol such as a two-dimensional code posted on a store or the like, the code symbol is displayed on the reading window 1021. If the code symbol is displayed on the reading window 1021, the information acquisition unit 501 decodes the code symbol to obtain a store ID and a company ID. Using the decoding as a trigger, a store where the terminal device is used is selected, a transaction ID is dispensed in the server device 3, and a record is generated in the transaction management information 354. The transaction ID, the store ID, and the company ID are correlated with the generation of the record, that is, the store related to the transaction is registered. Accordingly, the screen displayed by the display unit 55 transitions to the transaction start screen 103 (see FIG. 13C).

In transition to the transaction start screen 103, the loaned terminal 5 or the customer terminal 6 refers to the display setting 355 of the server device 3, and acquires the ON or OFF setting in the normal mode for each presentation content (e.g., various screens and operation elements in the screen, text data and image data displayed on the screen, and the like). Thereafter, the loaned terminal 5 or the customer terminal 6 uses the setting acquired here as long as there is no mode change.

The transaction start screen 103 in the normal mode includes a store name field 1031, a total amount field 1032, and operation elements 1033 to 1035 and 1019.

The store name field 1031 displays a store name corresponding to the store ID read on the check-in screen 102. The total amount field 1032 displays a total amount of prices of commodities for a transaction, that is, the registered commodities.

The operation element 1033 receives an operation of causing the screen displayed by the display unit 55 to transition to the reading screen 104 (see FIG. 13D). The operation element 1034 receives an operation of transitioning to a selection screen 110 (see FIG. 16, described later) for registering a commodity having no barcode. The operation element 1035 receives an operation of transitioning to a settlement cooperation screen 130 (see FIG. 19A described later).

The reading screen 104 in the normal mode includes the store name field 1031, a reading window 1041, and an operation element 1046. The operation element 1046 receives an operation of transitioning to a detail screen 120 (see FIG. 17 described later).

An image captured by the imaging unit 58 is displayed on the reading window 1041. The information acquisition unit 501 decodes a code symbol displayed on the reading window 1041.

If the imaging unit 58 of the loaned terminal 5 or the customer terminal 6 faces a code symbol such as a barcode, the code symbol is displayed on the reading window 1041. If the code symbol is displayed on the reading window 1041, the information acquisition unit 501 decodes the code symbol. If the code symbol is attached to the commodity, the information acquisition unit 501 acquires the commodity code. If the code symbol is for instructing mode switching, the pop-up window 105 (see FIG. 14A) is displayed on the reading screen 104 in a superimposed manner with the reading by the information acquisition unit 501 as a trigger.

The pop-up window 105 includes a message 1051 and an operation element 1052. The message 1051 is, for example, guidance such as "Switch to rental mode. Please input terminal code." The operation element 1052 receives an operation indicating approval of the content indicated by the message 1051. If the operation element 1052 is operated, the screen displayed by the display unit 55 transitions to the terminal authentication screen 106 (see FIG. 14B).

The terminal authentication screen 106 includes an input field 1061 and an operation element 1062. The operation element 1062 is, for example, a software keyboard including numeric keys assigned with numerical values of 0 to 9, a clear key for erasing an input content, and a confirmation key for confirming the input content. The input field 1061 displays the content input by the operation element 1062.

If the confirmation key of the operation element 1062 is operated, the screen displayed by the display unit 55 transitions to the terminal authentication screen 106 (see FIG. 14C). The terminal authentication screen 106 includes an operation element 1073. If the operation element 1073 is operated, the loaned terminal 5 transmits an inquiry to the server device 3.

The inquiry includes the company ID and the store ID, and the terminal code displayed in the input field 1061. If the terminal code included in the inquiry is registered in the store management information 351 as an owned terminal of a record matching the company ID and the store ID, a predetermined signal is transmitted as a response from the server device 3 to the loaned terminal 5.

In the loaned terminal 5 that receives the above-described predetermined signal from the server device 3, the screen displayed by the display unit 55 transitions to a top screen 201 in the rental mode (see FIG. 15A described later).

In transition to the top screen 201 in the rental mode, the loaned terminal 5 refers to the display setting 355 of the server device 3, and acquires the ON or OFF setting in the rental mode for each presentation content (e.g., various screens and operation elements in the screen, text data and image data displayed on the screen, and the like). Thereafter, the loaned terminal 5 uses the setting acquired here as long as there is no mode change.

FIGS. 15A to 15D are diagrams showing examples of screens displayed by the display unit 55 of the loaned terminal 5. FIG. 15A shows the top screen 201 in the rental mode. FIG. 15B shows a transaction start screen 203 in the rental mode. FIG. 15C shows a reading screen 204 in the rental mode. FIG. 15D shows an example of the reading screen 204 in which a pop-up window 205 is displayed in a superimposed manner.

The top screen 201 in the rental mode includes the store name field 1031 and the operation elements 1011 to 1013 and 1019. That is, the top screen 201 in the rental mode does not include the operation elements 1014 and 1015 in the top screen 101 in the normal mode. This is in accordance with setting in the display setting 355.

The top screen 201 in the rental mode includes the store name field 1031 that is not in the top screen 101 in the normal mode. This is because the rental mode is the operation mode switched after the store selection is completed in the normal mode, and the store selection or store registration is completed in the rental mode. The store name field 1031 on the top screen 201 in the rental mode further displays a terminal code ("S90" in the example of the drawing).

If the operation element 1011 on the top screen 201 receives an operation, the screen displayed by the display unit 55 transitions to the transaction start screen 203 in the rental mode. That is, in the rental mode, the check-in screen 102 (see FIG. 13B) is not displayed.

Similar to the transaction start screen 103 in the normal mode, the transaction start screen 203 in the rental mode includes the store name field 1031, the total amount field 1032, and the operation elements 1033 to 1035 and 1019. If the operation element 1033 receives an operation, the screen displayed by the display unit 55 transitions to the reading screen 204 in the rental mode.

Similar to the reading screen 104 in the normal mode, the reading screen 204 in the rental mode includes the store name field 1031, the reading window 1041, and the operation element 1046. An image captured by the imaging unit 58 is displayed on the reading window 1041. The information acquisition unit 501 decodes a code symbol displayed on the reading window 1041.

If the imaging unit 58 of the loaned terminal 5 faces a code symbol such as a barcode, the code symbol is displayed on the reading window 1041. If the code symbol is displayed on the reading window 1041, the information acquisition unit 501 decodes the code symbol. If the code symbol is attached to the commodity, the information acquisition unit 501 acquires the commodity code. If the code symbol is for instructing mode switching, the pop-up window 205 (see FIG. 15D) is displayed on the reading screen 204 in a superimposed manner with the reading by the information acquisition unit 501 as a trigger.

The pop-up 205 window includes a message 2051 and operation elements 2052 and 2053. If the operation element 2053 receives an operation, the pop-up window 205 is closed.

The message 2051 is, for example, a guidance message such as "Switch to normal mode." The operation element 2052 receives an operation indicating approval of the content indicated by the message 2051. If the operation element 2052 is operated, the screen displayed by the display unit 55 transitions to the top screen 101 in the normal mode (see FIG. 13A). At this time, if a transaction is in progress, the transaction is cancelled.

Figure 16:
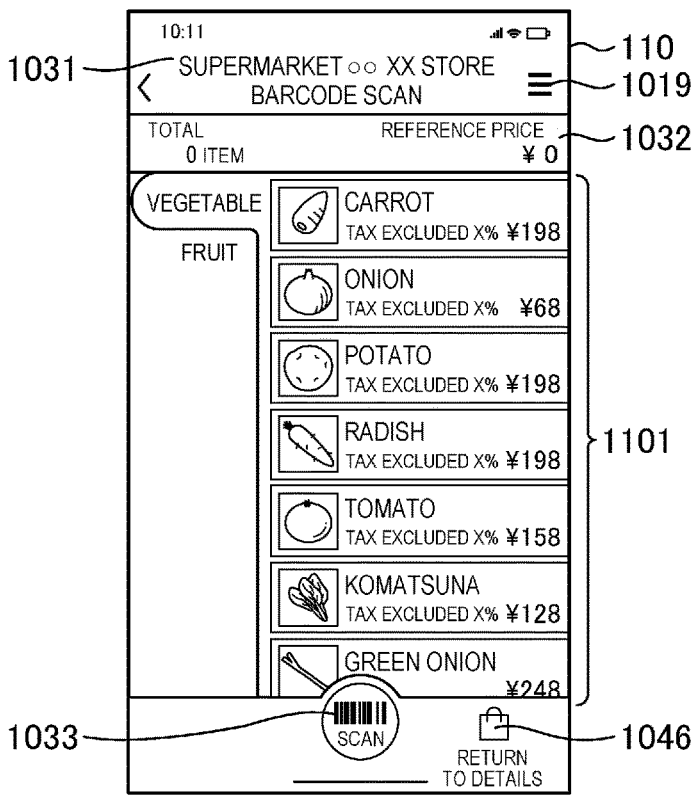
FIG. 16 is a diagram showing an example of a screen.

FIG. 16 is a diagram showing an example of a screen displayed by the display unit 55 of the loaned terminal 5 or the customer terminal 6, and shows an example of the selection screen 110 for registering a commodity having no barcode. If the operation element 1034 receives an operation on any one of the screens, the screen displayed by the display unit 55 transitions to the selection screen 110.

The selection screen 110 includes the store name field 1031, the total amount field 1032, and operation elements 1019, 1033, 1046, and 1101. The operation element 1101 is a so-called preset key, and receives a selection of commodities such as fruits and vegetables to which no code symbol is attached.

Referring back to FIG. 12, if a commodity code is acquired by the information acquisition unit 501 or the operation unit 56 during display of the reading screen 104, 204 or the selection screen 110, the commodity registration unit 504 registers commodity information matching the commodity code. The "register" here is that the commodity information is transmitted to the server device 3 together with the transaction ID, the store ID, and the company ID, and is stored in the transaction management information 354 in the server device 3.

If the commodity code is acquired, the commodity registration unit 504 controls the communication unit 54 to transmit the commodity code to the server device 3. In the server device 3 that receives the commodity code, the transaction registration update unit 302 updates the transaction management information 354. In addition to the above process, the commodity registration unit 504 acquires commodity information matching the commodity code from the commodity management information 352 of the server device 3 and displays the commodity information on the detail screen 120.

Figure 17:
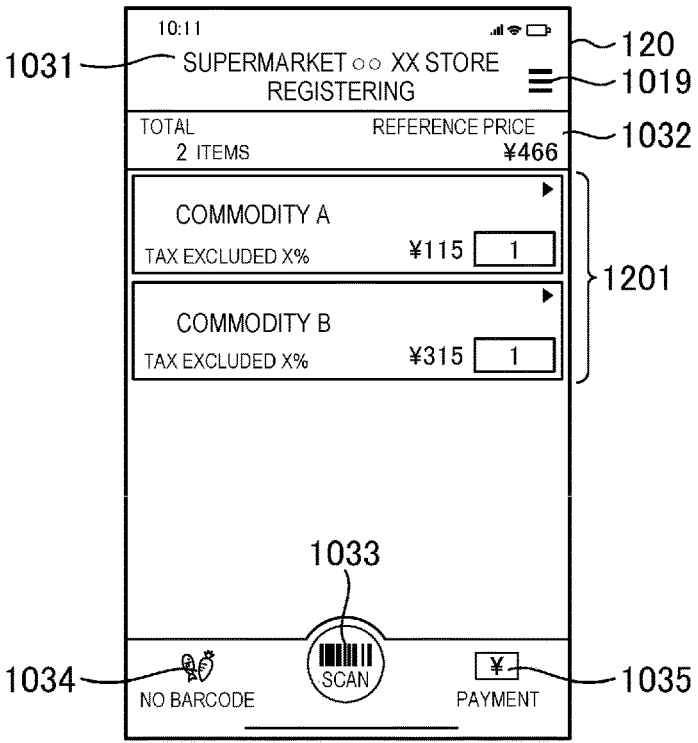
FIG. 17 is a diagram showing an example of a screen.

FIG. 17 is a diagram showing an example of a screen displayed by the display unit 55 of the loaned terminal 5 or the customer terminal 6, and shows an example of the detail screen 120. The detail screen 120 includes the store name field 1031, the total amount field 1032, the operation elements 1019, 1033, 1034, and 1035, and a detail field 1201. The detail field 1201 displays a list of pieces of information on registered commodities.

If an operation of changing the number is performed on the detail screen 120, the commodity registration unit 504 controls the communication unit 54 to transmit a commodity code of a commodity whose number is changed and the changed number to the server device 3. In the server device 3 that receives the commodity code and the number, the transaction registration update unit 302 updates the transaction management information 354.

Figure 18:
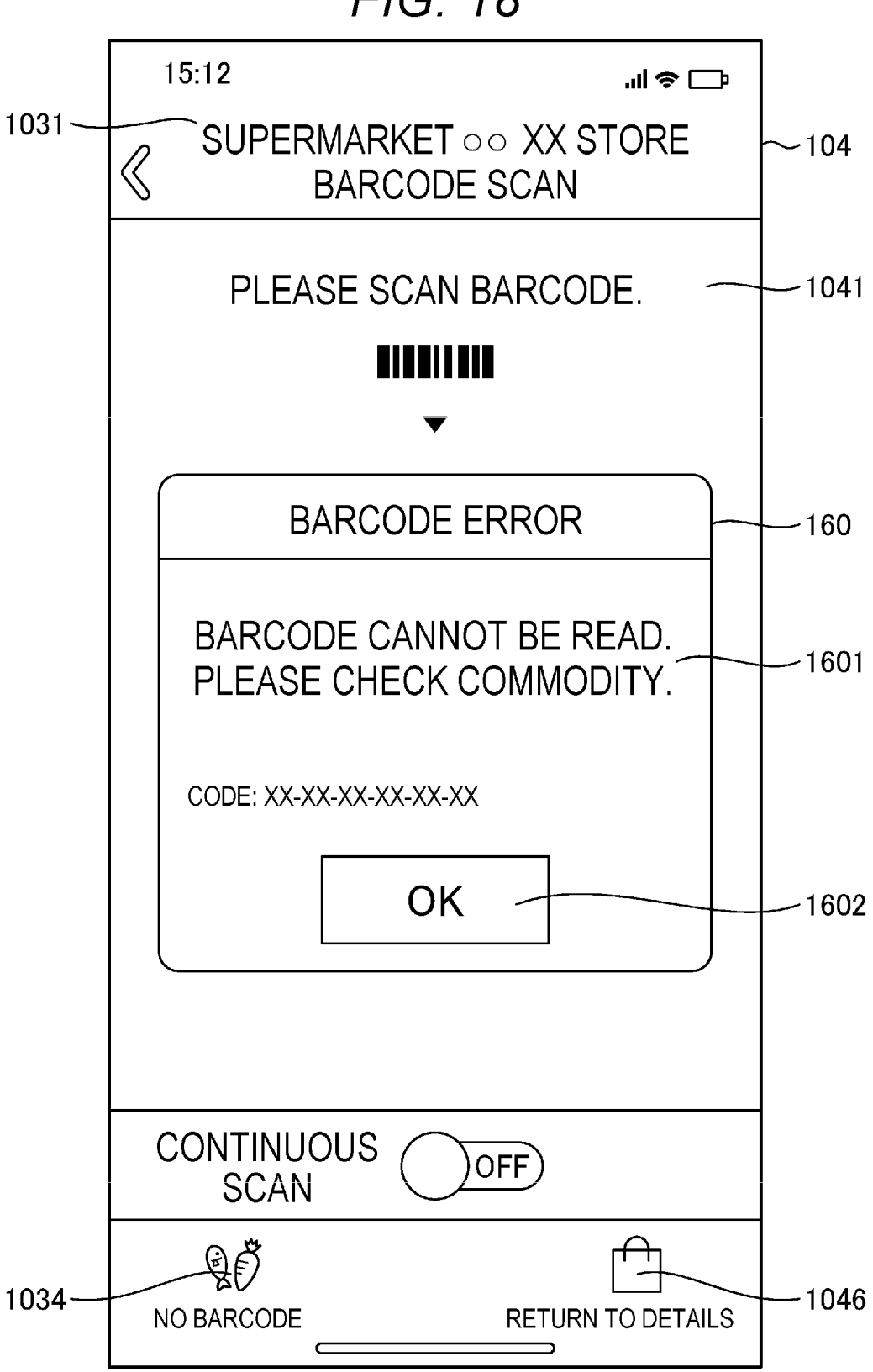
FIG. 18 is a diagram showing an example of a reading screen on which a pop-up window is displayed in a superimposed manner.

FIG. 18 is a diagram showing an example of the reading screen 104 on which a pop-up window 160 is displayed in a superimposed manner. The pop-up window 160 is displayed if, for example, a store clerk code is read during commodity registration. The pop-up window 160 includes a message 1601 and an operation element 1602.

The message 1601 is, for example, a guidance message such as "Barcode cannot be read. Please check commodity." The operation element 1602 receives an operation indicating approval of the content indicated by the message 1601. If the operation element 1602 is operated, the pop-up 160 is closed.

Referring back to FIG. 12, the settlement cooperation unit 505 performs a process for the checkout process performed by the checkout device 7. In that process, the settlement cooperation unit 505 first controls the display unit 55 to display a code symbol to be read by the checkout device 7 on the display unit 55.

FIGS. 19A to 19C are diagrams showing examples of screens displayed by the display unit 55 of the loaned terminal 5 or the customer terminal 6. FIG. 19A is an example of the settlement cooperation screen 130. FIG. 19B is an example of a standby screen 140. FIG. 19C is an example of a completion screen 150.

First, if the operation element 1035 receives an operation on any one of the screens, the screen displayed by the display unit 55 transitions to the settlement cooperation screen 130. The settlement cooperation screen 130 includes the store name field 1031, a message 1301, and a code symbol 1302 such as a barcode. The message 1301 is, for example, a guidance message such as "Please scan barcode on screen with scanner of checkout machine." The code symbol 1302 is obtained by encoding information including, for example, the transaction ID.

The checkout device 7 acquires the transaction ID by imaging and reading the code symbol 1302 with the code reader 76. In the checkout device 7, the company ID and the store ID are known in the store where the checkout device 7 is disposed. The checkout device 7 makes an inquiry including the transaction ID, the company ID, and the store ID to the server device 3, thereby obtaining information on the corresponding transaction as a response. Then, the checkout device 7 performs a checkout process.

If the checkout device 7 reads the code symbol 1302, the screen displayed by the display unit 55 transitions to the standby screen 140. The standby screen 140 includes the store name field 1031, a message 1401, and an operation element 1402. The message 1401 is, for example, a guidance message such as "Please make payment at checkout machine. If you wish to return to commodity registration, please speak to cashier." The operation element 1402 receives an instruction to start an operation by the cashier. When the operation element 1402 is operated, for example, reading of a store clerk code is prompted.

If the checkout process is completed in the checkout device 7, the screen displayed by the display unit 55 transitions to the completion screen 150. The completion screen 150 includes the store name field 1031, a message 1501, and an operation element 1502. The message 1501 is, for example, a greeting such as "Thank you for using our service." The operation element 1502 receives an operation of displaying a main menu. If the operation element 1502 receives an operation, the screen displayed by the display unit 55 transitions to the top screen 101 or 201 suitable for a current operation mode.

In the rental mode, that is, when the terminal device is the loaned terminal 5, if a predetermined time (for example, 20 seconds) elapses after the completion screen 150 is displayed, the screen transitions to the top screen 201 automatically.

The loaned terminal 5 after use is desirably returned to the charging station 8 by the customer. In the loaned terminal 5 returned to the charging station 8, if a transaction is still in progress, the control unit 50 cancels the transaction.

Referring back to FIG. 12, the help presentation unit 506 controls the display unit 55 to present a menu and help information. For presentation of the menu and the help information, the help presentation unit 506 refers to the display setting 355 to perform presentation suitable for the current operation mode.

FIGS. 20A and 20B, FIGS. 21A and 21B, FIGS. 22A and 22B, FIGS. 23A and 23B, and FIGS. 24A and 24B are diagrams showing examples of screens displayed by the display unit 55 of the loaned terminal 5 or the customer terminal 6.

FIG. 20A shows the menu 170 displayed prior to start of the transaction in the normal mode. FIG. 20B shows the menu 270 displayed prior to start of the transaction in the rental mode. FIG. 21A shows the menu 171 displayed after the start of the transaction in the normal mode. FIG. 21B shows the menu 271 displayed after the start of the transaction in the rental mode.

The menu 170 displayed prior to the start of the transaction in the normal mode includes operation elements 1701 to 1705. The operation element 1701 receives an operation of displaying a usage method. The operation element 1702 receives an operation of displaying terms of use. The operation element 1703 receives an operation of displaying frequently asked questions (FAQ). The operation element 1704 receives an operation of displaying information on an open source license. The operation element 1705 receives an operation of displaying customer information.

The menu 270 displayed prior to the start of the transaction in the rental mode includes the operation elements 1701, 1703, and 1704. That is, the menu 171 does not include the operation element 1702 for displaying terms of use and the operation element 1705 for displaying customer information.

The menu 171 displayed after the start of the transaction in the normal mode includes operation elements 1716 and 1717 in addition to the operation elements 1701 to 1705. The operation element 1716 receives an operation of registering a membership card ID. The operation element 1717 receives an operation of cancelling the transaction.

The menu 271 displayed after the start of the transaction in the rental mode includes the operation elements 1701, 1703, 1704, and 1717. That is, the menu 271 does not include the operation element 1716 for receiving the operation of registering a membership card ID.

Figures 22A, 22B, 23A, 23B:
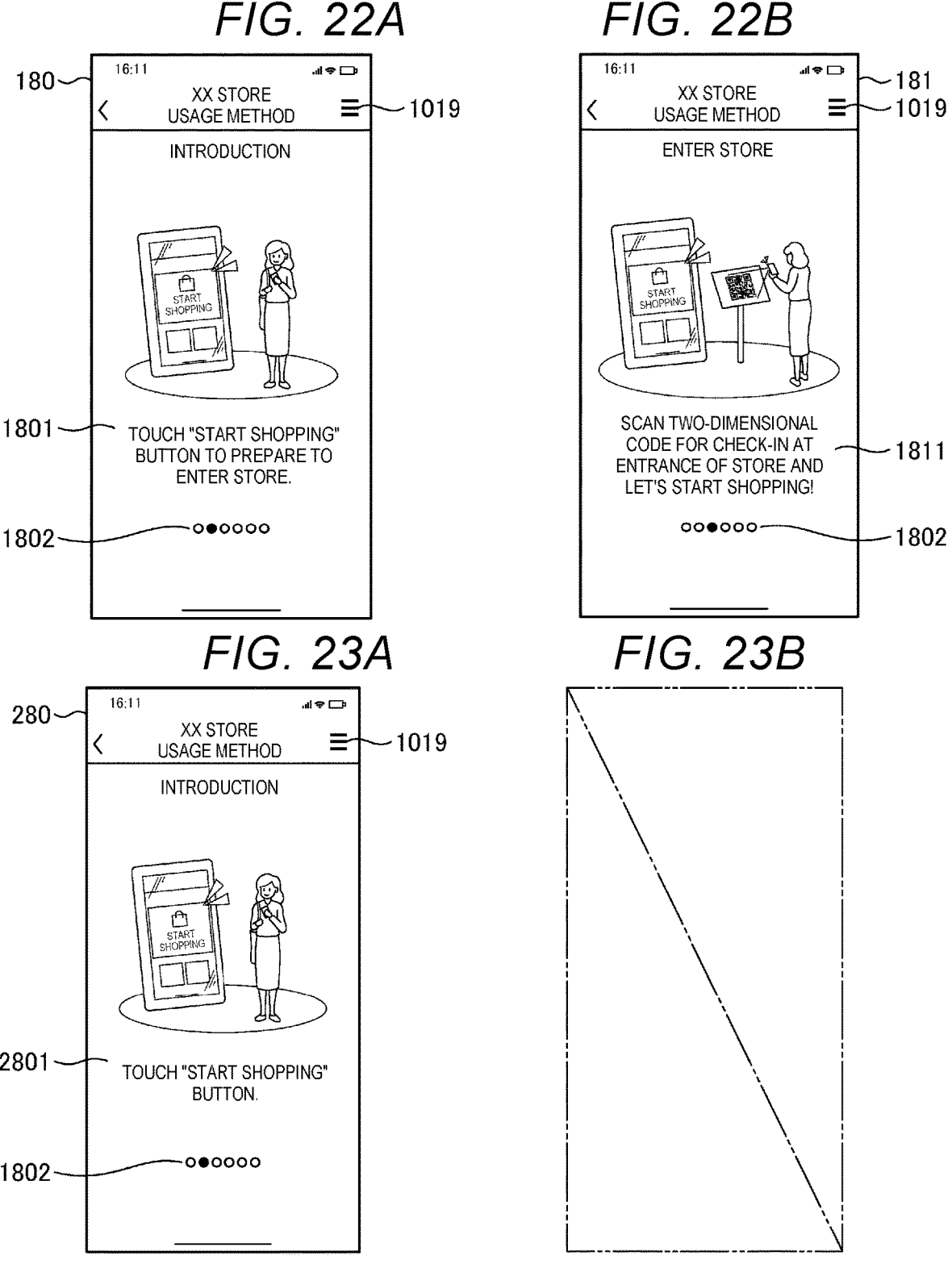
FIGS. 22A and 22B are diagrams showing examples of screens.
FIGS. 23A and 23B are diagrams showing examples of screens.

FIG. 22A shows a screen 180 on the second page of usage guidance in the normal mode. FIG. 22B shows a screen 181 on the third page of the usage guidance in the normal mode. FIG. 23A is a screen 280 on the second page of usage guidance in the rental mode. In the rental mode, there is no screen corresponding to FIG. 22B.

The screen 180 on the second page of the usage guidance in the normal mode includes the operation element 1019, a message 1801, and an indicator 1802. The message 1801 is, for example, a guidance message such as "Touch 'start shopping' button to prepare to enter store." The indicator 1802 indicates a position of a current page with respect to a total page.

The screen 181 on the third page of the usage guidance in the normal mode includes the operation element 1019, a message 1811, and the indicator 1802. The message 1811 is, for example, a guidance message such as "Scan two-dimensional code for check-in at entrance of store and let's start shopping!"

The screen 280 on the second page of the usage guidance in the rental mode includes the operation element 1019, a message 2801, and the indicator 1802. The message 2801 is, for example, a guidance message such as "Touch 'start shopping' button."

The message 2801 on the screen 280 is different from the message 1801 on the screen 180, except that wording regarding "to prepare to enter store" is removed. This is because, in the rental mode, the loaned terminal 5 already stores the company ID and the store ID, so there is no need to prepare for entering the store (i.e., no need for a check-in process). For a similar reason, in the rental mode, a screen corresponding to the screen 181 on the third page is not required.

FIGS. 24A and 24B are diagrams showing examples of screens displayed by the display unit 55 of the loaned terminal 5 or the customer terminal 6. FIG. 24A shows an FAQ screen 190 in the normal mode. FIG. 24B shows an FAQ screen 290 in the rental mode.

The FAQ screen 190 includes a major item 1901, minor items 1902 to 1908, and an operation element 1909. The major item 1901 is an item for grouping the minor items 1902 to 1908. The minor items 1902 to 1908 are operation elements for displaying frequently asked questions and answers thereto. More specifically, the minor items 1904 and 1905 are questions related to an available store, date, and time period, and the minor items 1906 to 1908 are questions related to the terminal. The operation element 1909 receives an operation for making an inquiry if the problem is not solved on the FAQ screen 190.

The FAQ screen 290 includes major items 1901, 1911, 1912, minor items 1902 and 1903, and 1913 to 1918. That is, the FAQ screen 290 in the rental mode does not include the operation element 1909 and the minor items 1904 to 1908. This is because, in the rental mode, a question related to an available store, date, and time period and a question related to the terminal are not required. The major items 1911 and 1912 and the minor items 1913 to 1918 displayed on the FAQ screen 290 are displayed by being scrolled on the FAQ screen 190.

When the loaned terminal 5 is returned to the charging station 8 and power supply from the charging station 8 is started, the charge clearing unit 507 cancels any transaction that is in progress. In response to the cancellation of the transaction, the charge clearing unit 507 notifies the server device 3 that the transaction is to be cancelled along with the transaction ID. The server device 3 that receives the notification deletes a record of the corresponding transaction ID in the transaction management information 354. After the server device 3 is notified, the charge clearing unit 507 erases the transaction ID stored in the storage unit 59.

Accordingly, even if the customer who starts a transaction using the loaned terminal 5 stops the use of the loaned terminal 5 and returns the loaned terminal 5 to the charging station 8 due to reasons such as difficulty in using the loaned terminal 5, it is possible to automatically cancel the transaction in progress without a manual operation.

If an operation (e.g., shutdown or restart) of forcibly turning off the power is performed on the loaned terminal 5 and the customer terminal 6, the transaction in progress is not cancelled. That is, the terminal device does not erase the transaction ID of the transaction that is in progress and the server device 3 is not notified. Therefore, in the server device 3, a record in the transaction management information 354 is not deleted. If the transaction ID is stored in the storage unit 59, the restarted terminal device takes over the transaction stored in the transaction management information 354 of the server device 3 with the transaction ID. Accordingly, the same transaction is continued. Accordingly, if the terminal device has to be restarted due to, for example, freezing of the application software, it is not necessary to perform the commodity registration again, which is preferable.

Figure 25:
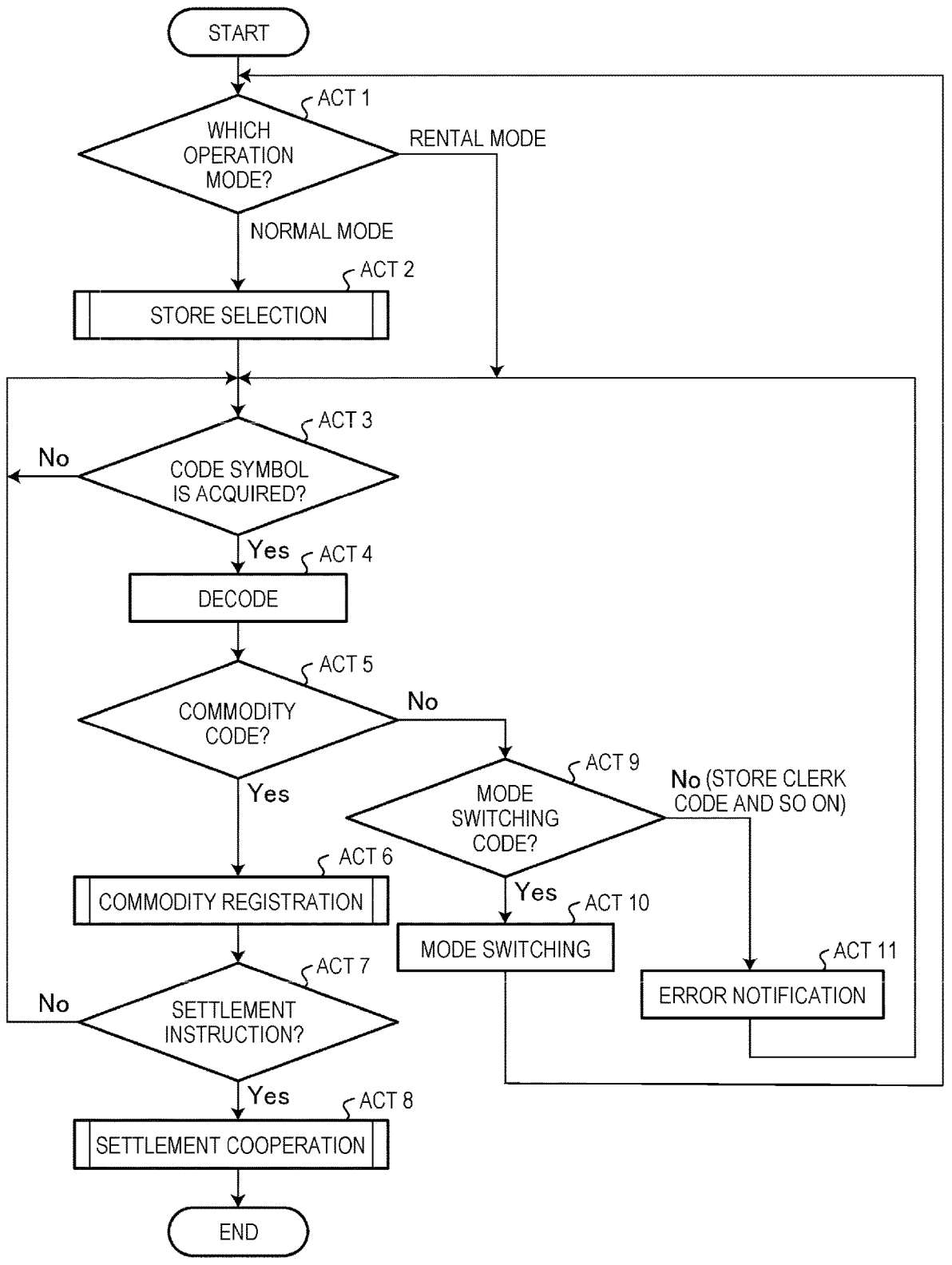
FIG. 25 is a flowchart showing an example of a flow of processes executed by a terminal.

FIG. 25 is a flowchart showing an example of a flow of processes executed by the loaned terminal 5 and the customer terminal 6 in accordance with the program 591.

First, the controller 50 checks the operation mode (ACT 1). If the operation mode is the normal mode, store selection (ACT 2) by the store selection unit 502 (i.e., the store selection function) is performed to start a transaction, and the process proceeds to the next ACT 3. If the operation mode is the rental mode in ACT 1, the transaction is started without performing ACT 2, and the process proceeds to the next ACT 3.

In ACT 3, if the controller 50 acquires a code symbol (ACT 3; Yes), the controller 50 decodes the code symbol (ACT 4). If the decoded code symbol is a commodity code (ACT 5; Yes), the controller 50 performs commodity registration by using the commodity registration unit 504 (ACT 6). If there is no settlement instruction (ACT 7; No), the controller 50 returns the process to ACT 3. If there is a settlement instruction (ACT 7; Yes), the controller 50 performs a settlement process by the settlement cooperation unit 505 (ACT 8), and ends the present process.

In ACT 5, if the code symbol is not a commodity code (ACT 5; No), the controller 50 determines whether the decoded code symbol is a mode switching code (ACT 9).

In ACT 9, if the decoded code symbol is the mode switching code (ACT 9; Yes), the controller 50 performs mode switching by using the mode switching unit 503 (ACT 10), and returns the process to ACT 1.

If the decoded code symbol is not the mode switching code in ACT 9 (ACT 9; No), the controller 50 performs error notification (ACT 11) and returns the process to ACT 3.

The sales data processing system 1 and the loaned terminal 5 and the customer terminal 6 can achieve the following effects.

First, the same program 591 can provide a normal mode suitable for the customer terminal 6 and a rental mode suitable for the loaned terminal 5.

Accordingly, unnecessary operations and screens can be omitted in the loaned terminal 5. Accordingly, operability can be improved and user satisfaction can be improved.

Wording of an expression or text that is not suitable for the loaned terminal 5 can be changed to a suitable expression.

When downloading the application software, a user does not suffer from complexity of selecting from a plurality of types and inconvenience of downloading wrong application software.

An application software provider can eliminate complexity of management or maintenance of a plurality of pieces of application software in the same way, and inconvenience related to differences in operation due to an omission or an error in maintenance.

In the above embodiments, the function(s) to be in an unused or unusable state in the rental mode (a second mode) are the store selection function, but examples are not limited to this. That is, an unused or unusable function in the second mode may be any function other than, or in addition to, the store selection function. When another function is to be in an unused state, the timing at which the function is unusable need not be limited to one immediately after start of use of the terminal device and the application software. In this case, the operation mode may be checked at an appropriate time before use.

In an embodiment, the server device 3 is a cloud server, but in other implementations, the server device 3 may be provided in a store. In this case, the server device 3 may also serve as the store terminal 4.

Alternatively, part of functions of the server device 3 may be implemented in the store terminal 4.

Each POS terminal acquires the commodity information from the server device 3 on the cloud, but implementation is not limited to this. For example, a commodity master database in which only the commodity information of the store is extracted from the commodity management information 352 may be provided in the store terminal 4 in the store, and the POS terminal in the store may refer to the commodity master database via the in-store network 91. In the case of such a configuration, the information stored in the commodity management information 352 is transmitted to the store terminal 4 in each store at a predetermined timing such as, a part of a time period from after the store closes to before the store opens, and the store terminal 4 that receives the transmitted commodity information updates the commodity master based on the received commodity information.

A program executed by each device in the above-described embodiments can be stored in advance in a ROM or the like. The program executed by the device in the above-described embodiments may be installed from a computer-readable recording medium such as a CD-ROM, a flexible disk (FD), a CD-R, or a digital versatile disk (DVD) as a file in an installable or executable format.

Further, the program executed by each device may be stored in a computer connected to a network such as the Internet and downloaded via a network. The program executed by the device in the above-described embodiments may be provided, distributed, or otherwise accessed via a network such as the Internet.

While certain embodiments have been described, these embodiments have been presented by way of example only, and are not intended to limit the scope of the disclosure. The novel embodiments described herein may be embodied in a variety of other forms; and various omissions, substitutions, changes, and combinations in the form of the embodiments described herein may be made without departing from the spirit of the disclosure. The embodiments and the modifications thereof are included in the scope and the spirit of the disclosure, and are included in a scope of the invention disclosed in the claims and equivalents thereof.

What is claimed is:

1. A method for controlling a terminal capable of performing a point-of-sale (POS) function at a store, the method comprising:

generating a first screen through which a particular operation can be input via an input device of the terminal or a particular symbol can be input via an imaging device of the terminal;

determining an operation mode of the terminal based on the particular operation or the particular symbol that was input through the first screen, the operation mode being either a customer terminal mode in which the terminal operates as if the terminal were owned by a customer or a loaned terminal mode in which the terminal operates as if the terminal were loaned by the store to the customer;

when the operation mode is the customer terminal mode, before starting a sales transaction, generating a second screen through which a store for the transaction to be performed can be selected; and generating a third screen through which a commodity can be registered for purchase in the transaction at the store that has been selected through the second screen;

when the operation mode is the loaned terminal mode, before starting a sales transaction, generating a fourth screen through which a code of the terminal can be input;

transmitting the input code to a server that manages the terminal; and generating a fifth screen through which a commodity can be registered for purchase in the transaction at the store that has been associated with the terminal; and storing display setting information about screens, items, or messages to be displayed on the terminal differently depending on the operation mode of the terminal.

2. The method according to claim 1, further comprising: scanning the particular symbol presented in the store and acquiring a store ID from the particular symbol.

3. The method according to claim 1, further comprising: receiving an input of commodity information via the input device or the imaging device; and registering a commodity corresponding to the commodity information for purchase.

4. The method according to claim 1, further comprising: upon detection of charging a battery of the terminal in the loaned terminal mode, cancelling an uncompleted sales transaction.

5. A terminal capable of performing a point-of-sale (POS) function at a store, comprising:

an input device;

an imaging device;

a display device;

a communication interface connectable to a server that manages the terminal; and a processor configured to:

generate a first screen through which a particular operation can be input via the input device or a particular symbol can be input via the imaging device, determine an operation mode of the terminal based on the particular operation or the particular symbol that was input through the first screen, the operation mode being either a customer terminal mode in which the terminal operates as if the terminal were owned by a customer or a loaned terminal mode in which the terminal operates as if the terminal were loaned by the store to the customer, when the operation mode is the customer terminal mode, before starting a sales transaction, generate a second screen through which a store for the transaction to be performed can be selected, and generate a third screen through which a commodity can be registered for purchase in the transaction at the store that has been selected through the second screen;

when the operation mode is the loaned terminal mode, before starting a sales transaction, generate a fourth screen through which a code of the terminal can be input;

transmit the input code to the server that manages the terminal; and generate a fifth screen through which a commodity can be registered for purchase in the transaction at the store that has been associated with the terminal; and store display setting information about screens, items, or messages to be displayed on the terminal differently depending on the operation mode of the terminal.

6. The terminal according to claim 5, wherein the processor is configured to control the imaging device to scan the particular symbol presented in the store and acquire a store ID from the particular symbol.

7. The terminal according to claim 5, wherein the processor is configured to, upon receipt of an input of commodity information via the input device or the imaging device, register a commodity corresponding to the commodity information for purchase.

8. The terminal according to claim 5, further comprising: a battery, wherein the processor is configured to upon detection of charging the battery in the loaned terminal mode, cancel an uncompleted sales transaction.

9. A non-transitory, computer-readable medium storing a program causing a computer to execute a method for controlling a terminal capable of performing a point-of-sale (POS) function at a store, the method comprising:

generating a first screen through which of a particular operation can be input via an input device of the terminal or a particular symbol can be input via an imaging device of the terminal;

determining an operation mode of the terminal based on the particular operation or the particular symbol that was input through the first screen, the operation mode being either a customer terminal mode in which the terminal operates as if a terminal were owned by a customer or a loaned terminal mode in which the terminal operates as if the terminal were loaned by the store to the customer;

when the operation mode is the customer terminal mode, before starting a sales transaction, generating a second screen through which a store for the transaction to be performed can be selected; and generating a third screen through which a commodity can be registered for purchase in the transaction at the store that has been selected through the second screen;

when the operation mode is the loaned terminal mode, before starting a sales transaction, generating a fourth screen through which a code of the terminal can be input;

transmitting the input code to a server that manages the terminal; and generating a fifth screen through which a commodity can be registered for purchase in the transaction at the store that has been associated with the terminal; and storing display setting information about screens, items, or messages to be displayed on the terminal differently depending on the operation mode of the terminal.

10. The computer readable medium according to claim 9, wherein the method further includes scanning the particular symbol presented in the store and acquiring a store ID from the particular symbol.

11. The computer readable medium according to claim 9, wherein the method further comprises:

receiving an input of commodity information via the input device or the imaging device; and registering a commodity corresponding to the commodity information for purchase.

12. The computer readable medium according to claim 9, wherein the method further comprises:

upon detection of charging a battery of the terminal in the loaned terminal mode, cancelling an uncompleted sales transaction.

\* \* \* \* \*